(12) United States Patent
Jackson et al.

(10) Patent No.: US 11,381,858 B2
(45) Date of Patent: Jul. 5, 2022

(54) SYSTEMS AND METHODS FOR FACILITATING CONTENT DISCOVERY BASED ON VIEWER RATINGS

(71) Applicant: DISH Technologies L.L.C., Englewood, CO (US)

(72) Inventors: Mark Jackson, Castle Rock, CO (US); Henry Gregg Martch, Parker, CO (US)

(73) Assignee: DISH Technologies L.L.C., Englewood, CO (US)

(*) Notice: Subject to any disclaimer, the term of this patent is extended or adjusted under 35 U.S.C. 154(b) by 40 days.

(21) Appl. No.: 16/670,235

(22) Filed: Oct. 31, 2019

(65) Prior Publication Data

US 2020/0068240 A1 Feb. 27, 2020

Related U.S. Application Data

(63) Continuation of application No. 15/879,884, filed on Jan. 25, 2018, now Pat. No. 10,499,096, which is a
(Continued)

(51) Int. Cl.
*H04N 21/25* (2011.01)
*H04N 21/475* (2011.01)
(Continued)

(52) U.S. Cl.
CPC ......... *H04N 21/251* (2013.01); *H04N 21/252* (2013.01); *H04N 21/25875* (2013.01);
(Continued)

(58) Field of Classification Search
CPC ............ H04N 21/4756; H04N 21/252; H04N 21/251; H04N 21/25891; H04N 21/2353;
(Continued)

(56) References Cited

U.S. PATENT DOCUMENTS 7,895,625 B1 2/2011 Bryan et al.
8,495,679 B2 7/2013 Labeeb et al.
(Continued)

FOREIGN PATENT DOCUMENTS

WO 2005/029859 A1 3/2005
WO 2009/030775 A1 3/2009
(Continued)

OTHER PUBLICATIONS

European Search Report for EP10153220 dated Jun. 18, 2010, all pages.
(Continued)

*Primary Examiner* — Pinkal R Chokshi
(74) *Attorney, Agent, or Firm* — Kilpatrick Townsend & Stockton LLP

(57) ABSTRACT

Systems, methods, and computer-readable media are provided to assist users to locate content of interest based on viewer ratings. First information enabling unique identification of a first user may be processed. Indications of ratings of television programming may be processed, the indications being received from a first media device associated with the first user. Ratings information associated with the first user may be retained in repositories, the ratings information being based on the indications. The first user may be matched to a category that represents a classification of a set of viewers and/or of a set of content based on a set of attributes. Descriptive content indicative of the first user and/or content rated by the first user may be selected and may be transmitted via the network to a second media device associated with a second user.

20 Claims, 9 Drawing Sheets

Related U.S. Application Data continuation of application No. 14/454,488, filed on Aug. 7, 2014, now Pat. No. 9,912,973.

(51) Int. Cl.
    *H04N 21/258*     (2011.01)
    *H04N 21/658*     (2011.01)
    *H04N 21/442*     (2011.01)

(52) U.S. Cl.
    CPC . *H04N 21/25891* (2013.01); *H04N 21/44226* (2020.08); *H04N 21/4756* (2013.01); *H04N 21/6582* (2013.01)

(58) Field of Classification Search
    CPC ......... H04N 21/2407; H04N 21/44222; H04N 21/6582
    See application file for complete search history.

(56) References Cited

U.S. PATENT DOCUMENTS

| | | | |
|---|---|---|---|
| 8,893,012 | B1 | 11/2014 | Zhang et al. |
| 9,288,551 | B2 | 3/2016 | Kummer |
| 9,326,025 | B2* | 4/2016 | Rao .................. H04N 21/47 |
| 9,621,960 | B2 | 4/2017 | Hardy et al. |
| 9,769,540 | B2 | 9/2017 | Kummer |
| 9,912,973 | B2 | 3/2018 | Jackson et al. |
| 2002/0090198 | A1 | 7/2002 | Rosenberg et al. |
| 2003/0154475 | A1 | 8/2003 | Rodriguez et al. |
| 2003/0172376 | A1 | 9/2003 | Coffin, III |
| 2005/0091690 | A1 | 4/2005 | Delpuch et al. |
| 2006/0174277 | A1 | 8/2006 | Sezan et al. |
| 2007/0073646 | A1* | 3/2007 | Uchibe ................ H04H 60/37 |
| 2007/0169165 | A1 | 7/2007 | Crull et al. |
| 2007/0199025 | A1 | 8/2007 | Angiolillo et al. |
| 2007/0288951 | A1 | 12/2007 | Ray et al. |
| 2008/0244666 | A1 | 10/2008 | Moon et al. |
| 2008/0244678 | A1 | 10/2008 | Kim et al. |
| 2008/0270038 | A1 | 10/2008 | Partovi et al. |
| 2009/0083126 | A1* | 3/2009 | Koren ................ G06Q 30/0631 |
| | | | 705/7.29 |
| 2009/0210898 | A1 | 8/2009 | Childress et al. |
| 2009/0228911 | A1 | 9/2009 | Vrijsen |
| 2010/0064306 | A1 | 3/2010 | Tiongson et al. |
| 2010/0071007 | A1 | 3/2010 | Meijer |
| 2010/0125630 | A1* | 5/2010 | Krishnamurthy ...... G06Q 50/10 |
| | | | 709/204 |
| 2010/0125864 | A1 | 5/2010 | Dwyer et al. |
| 2010/0146560 | A1 | 6/2010 | Bonfrer |
| 2010/0175085 | A1 | 7/2010 | Seol |
| 2010/0218214 | A1 | 8/2010 | Fan et al. |
| 2010/0242076 | A1 | 9/2010 | Potesta et al. |
| 2010/0272257 | A1 | 10/2010 | Beals |
| 2010/0305729 | A1 | 12/2010 | Glitsch et al. |
| 2011/0041075 | A1* | 2/2011 | Cierniak ................ G06Q 30/02 |
| | | | 715/745 |
| 2011/0055871 | A1 | 3/2011 | Bi et al. |
| 2011/0082858 | A1 | 4/2011 | Yu et al. |
| 2011/0153609 | A1* | 6/2011 | Oami ................... G06Q 30/02 |
| | | | 707/738 |
| 2011/0173337 | A1 | 7/2011 | Walsh et al. |
| 2011/0194833 | A1 | 8/2011 | Jong |
| 2011/0295667 | A1 | 12/2011 | Butler |
| 2012/0054148 | A1* | 3/2012 | Flinn ................... H04L 65/403 |
| | | | 707/603 |
| 2012/0078953 | A1 | 3/2012 | Araya |
| 2012/0110615 | A1 | 5/2012 | Kilar et al. |
| 2012/0110616 | A1 | 5/2012 | Kilar et al. |
| 2012/0124625 | A1 | 5/2012 | Foote et al. |
| 2012/0260295 | A1 | 10/2012 | Rondeau |
| 2012/0278834 | A1 | 11/2012 | Richardson |
| 2012/0284745 | A1 | 11/2012 | Strong |
| 2012/0295560 | A1 | 11/2012 | Mufti |
| 2013/0031216 | A1 | 1/2013 | Willis et al. |
| 2013/0060648 | A1 | 3/2013 | Maskatia et al. |
| 2013/0071090 | A1 | 3/2013 | Berkowitz et al. |
| 2013/0268951 | A1 | 10/2013 | Wyatt et al. |
| 2013/0290131 | A1 | 10/2013 | Bjork et al. |
| 2013/0291037 | A1 | 10/2013 | Im et al. |
| 2013/0312041 | A1* | 11/2013 | Gresta ................ H04N 7/17318 |
| | | | 725/61 |
| 2014/0025609 | A1 | 1/2014 | Coster et al. |
| 2014/0068692 | A1 | 3/2014 | Archibong et al. |
| 2014/0114966 | A1 | 4/2014 | Bilinski et al. |
| 2014/0150009 | A1 | 5/2014 | Sharma |
| 2014/0278308 | A1 | 9/2014 | Liu et al. |
| 2014/0282744 | A1 | 9/2014 | Hardy et al. |
| 2014/0282779 | A1 | 9/2014 | Navarro |
| 2015/0095154 | A1 | 4/2015 | Kannan |
| 2015/0150052 | A1 | 5/2015 | Errico et al. |
| 2015/0208120 | A1 | 7/2015 | Yao |
| 2016/0037204 | A1* | 2/2016 | McSweeney ........ H04N 21/458 |
| | | | 725/39 |
| 2016/0112524 | A1* | 4/2016 | Sutou .................. H04N 21/858 |
| | | | 709/206 |

FOREIGN PATENT DOCUMENTS

| | | |
|---|---|---|
| WO | 2011/040999 A1 | 4/2011 |
| WO | 2014/072742 A1 | 5/2014 |
| WO | 2014/164782 A1 | 10/2014 |

OTHER PUBLICATIONS

Pinkston, Tristi, "What is Listmania?", posted on Apr. 17, 2008 on www.families.com; Retrieved via WayBack Machine on Jan. 4, 2013 from : http://web.archive.org/web/20130104144011/http:www.families.com/blog/what-is-listmania, 1 page.

International Search Report and Written Opinion for PCT/US2014/023466 dated Jul. 10, 2014, 15 pages.

International Preliminary Report on Patentability for PCT/US2014/023466 dated Sep. 15, 2015, 8 pages.

International Search Report and Written Opinion for PCT/GB2015/052570 dated Dec. 11, 2015, 13 pages.

U.S. Appl. No. 13/834,916, filed Mar. 15, 2013 Non Final Office Action dated Aug. 8, 2014, 19 pages.

U.S. Appl. No. 13/834,916, filed Mar. 15, 2013 Final Office Action dated Jan. 12, 2015, 22 pages.

U.S. Appl. No. 13/834,916, filed Mar. 15, 2013 Non Final Office Action dated Apr. 27, 2015, 22 pages.

U.S. Appl. No. 13/834,916, filed Mar. 15, 2013 Final Office Action dated Dec. 14, 2015, 31 pages.

U.S. Appl. No. 13/834,916, filed Mar. 15, 2013 Non-Final Rejection dated Aug. 18, 2016, all pages.

U.S. Appl. No. 14/454,488, filed Aug. 7, 2014 Preinterview first office action dated Mar. 28, 2016, all pages.

U.S. Appl. No. 14/454,488, filed Aug. 7, 2014 Final Rejection dated May 26, 2016, all pages.

U.S. Appl. No. 14/454,488, filed Aug. 7, 2014 Non-Final Rejection dated Sep. 20, 2016, all pages.

U.S. Appl. No. 14/454,488, filed Aug. 7, 2014 Final Rejection dated Feb. 6, 2017, all pages.

U.S. Appl. No. 14/454,488, filed Aug. 7, 2014 Notice of Allowance dated Jun. 30, 2017, all pages.

U.S. Appl. No. 14/454,488, filed Aug. 7, 2014 Notice of Allowance dated Nov. 30, 2017, all pages.

\* cited by examiner

SYSTEMS AND METHODS FOR FACILITATING CONTENT DISCOVERY BASED ON VIEWER RATINGS

CROSS-REFERENCES TO RELATED APPLICATIONS

This application is a continuation U.S. application Ser. No. 15/879,884, filed Jan. 25, 2018, entitled "Systems and Methods for Facilitating Content Discovery Based on Viewer Ratings," which application is a continuation of U.S. application Ser. No. 14/454,488, filed Aug. 7, 2014, entitled "Systems and Methods for Facilitating Content Discovery Based on Viewer Ratings," now U.S. Pat. No. 9,912,973, issued on Mar. 6, 2018, the disclosures of which are incorporated by reference herein in their entirety.

BACKGROUND

This disclosure generally relates to systems and methods of content discovery and distribution, and more particularly to systems and methods for facilitating content discovery based on viewer ratings.

Users of televisions and other video distribution platforms now have more options than ever to view video content. In addition to live broadcasts of content and local recordings of content (e.g., using a digital video recorder), content may be accessible from various sources via a network (e.g., the Internet). However, with the vast array of television channels and other conventional options allowing for greater access to content, a user can encounter a number of difficulties. Chief among the difficulties is the amount of time and effort necessary to search for particular programs of interest. The options can be overwhelming to many users and can make process of locating content difficult and inefficient.

Thus, there is a need for systems and methods that address the foregoing problems in order to provide users with better experiences. This and other needs are addressed by the present disclosure.

BRIEF SUMMARY

Certain embodiments of the present disclosure relate generally to systems and methods of content discovery and distribution, and more particularly to systems and methods for facilitating content discovery based on viewer ratings.

In one aspect, a method is provided to assist users to locate content of interest based at least in part on viewer ratings. A service provider system may perform one or a combination of the following. First information enabling unique identification of a first user may be processed. A first set of one or more indications of ratings of television programming may be processed, the first set of one or more indications being received, via a network, from a first media device associated with the first user and consequent to selections of user-selectable options to rate television programs provided with the first media device. Ratings information associated with the first user may be retained in one or more repositories, the ratings information being at least partially based on the first set of one or more indications. The first user may be matched to a first category from a set of categories, where the first user matches one or more categories from the set of categories, the first category representing a first classification of a first set of viewers and/or of a first set of content based at least in part on a first set of attributes defined for the first set of viewers and/or the first set of content. Descriptive content indicative of the first user and/or content rated by the first user may be selected. The descriptive content may be transmitted via the network to a second media device associated with a second user.

In another aspect, a system is provided to assist users to locate content of interest based at least in part on viewer ratings. The system may include a service provider system that includes one or more network interfaces accessible from a network and one or more processors coupled to at least one of the one or more network interfaces and to one or more repositories. The one or more processors may execute instructions to perform one or a combination of the following. First information enabling unique identification of a first user may be processed. A first set of one or more indications of ratings of television programming may be processed, the first set of one or more indications being received, via a network, from a first media device associated with the first user and consequent to selections of user-selectable options to rate television programs provided with the first media device. Ratings information associated with the first user may be retained in one or more repositories, the ratings information being at least partially based on the first set of one or more indications. The first user may be matched to a first category from a set of categories, where the first user matches one or more categories from the set of categories, the first category representing a first classification of a first set of viewers and/or of a first set of content based at least in part on a first set of attributes defined for the first set of viewers and/or the first set of content. Descriptive content indicative of the first user and/or content rated by the first user may be selected. The descriptive content may be transmitted via the network to a second media device associated with a second user.

In yet another aspect, one or more non-transitory, machine-readable media are provided. The one or more non-transitory, machine-readable media have machine-readable instructions thereon which, when executed by one or more processing devices, assist users to locate content of interest based at least in part on viewer ratings, causing the one or more processing devices to perform one or a combination of the following. First information enabling unique identification of a first user may be processed. A first set of one or more indications of ratings of television programming may be processed, the first set of one or more indications being received, via a network, from a first media device associated with the first user and consequent to selections of user-selectable options to rate television programs provided with the first media device. Ratings information associated with the first user may be retained in one or more repositories, the ratings information being at least partially based on the first set of one or more indications. The first user may be matched to a first category from a set of categories, where the first user matches one or more categories from the set of categories, the first category representing a first classification of a first set of viewers and/or of a first set of content based at least in part on a first set of attributes defined for the first set of viewers and/or the first set of content. Descriptive content indicative of the first user and/or content rated by the first user may be selected. The descriptive content may be transmitted via the network to a second media device associated with a second user.

In various embodiments, an indication of user interest in the first user and/or the content rated by the first user may be processed. The indication of user interest may be received, via the network, from the second media device associated with the second user consequent to second user selection of a second user-selectable option to indicate an interest in the first user and/or in the content rated by the first user. An association of the second media device and/or the second user with the first user may be retained in the one or more repositories.

In various embodiments, an association of the second media device and/or the second user with the first user may be retained in the one or more repositories. A second set of one or more indications of ratings of television programming may be processed, the second set of one or more indications corresponding to ratings by the first user. A first television program may be selected, based at least in part on the second set of one or more indications, for action directed to the second media device associated with the second user second user.

In various embodiments, the descriptive content may include a recommendation of a first television program. In various embodiments, prior to the transmitting, the second media device and/or the second user may be identified based at least in part on the first category. In various embodiments, indicia of user interest in the first user and/or the content rated by the first user may be tracked, the indicia of user interest being accumulated from a plurality of media devices. In various embodiments, the first user may be qualified based at least in part on the indicia of user interest.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
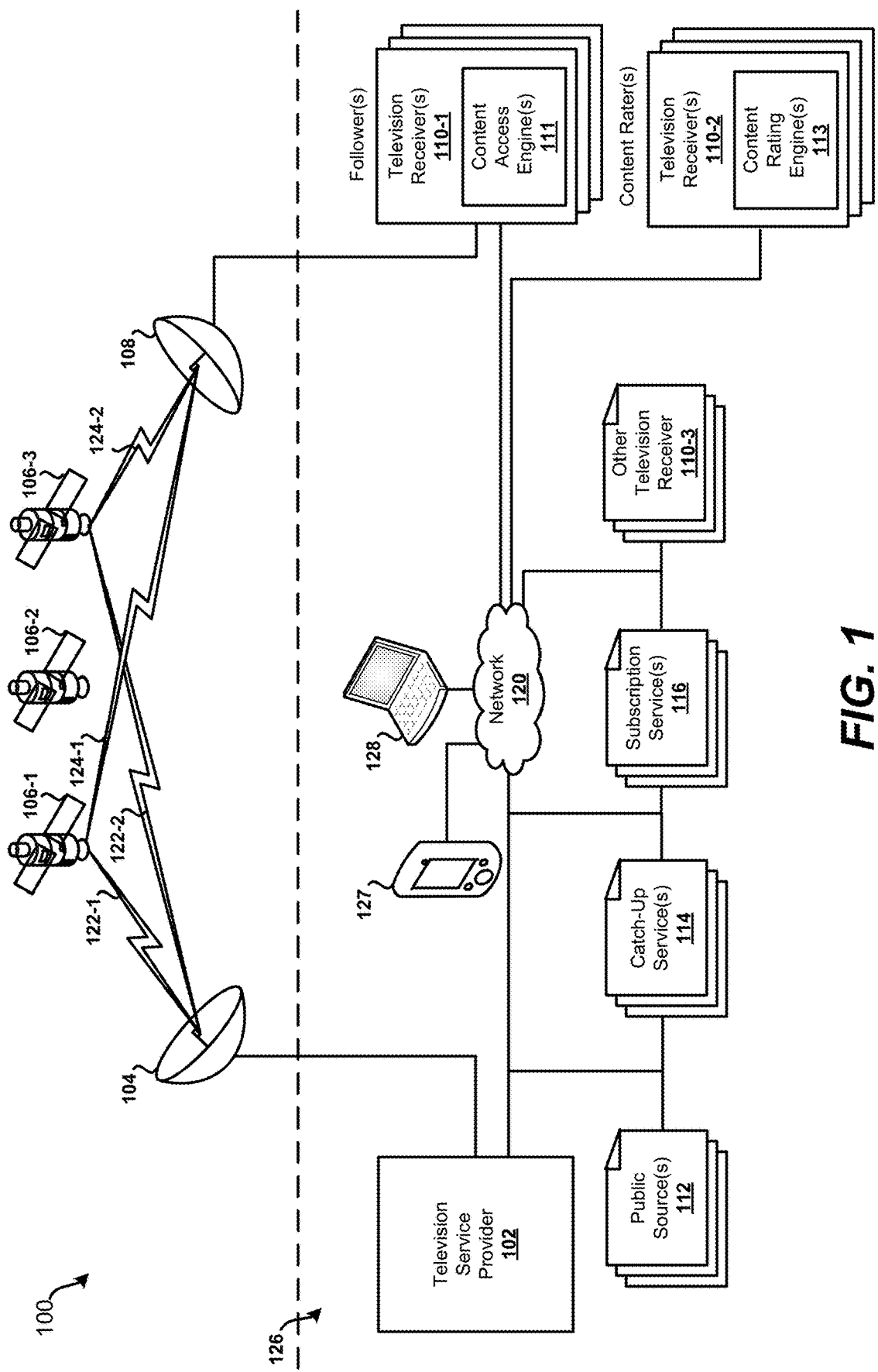
FIG. 1 illustrates an embodiment of a satellite-based television programming distribution system, in accordance with certain embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Certain embodiments according to the present disclosure facilitate content discovery based on ratings of viewers in part by providing an application or embedded program on a set-top box or other platform that allows users to create lists of their favorite content. Certain embodiments may allow a content rater to rate programs, have corresponding rating information uploaded from the content rater's television receiver to the cloud-based system, and have the content rater's preferences updated. Accordingly, a content rater may amass ratings information regarding multiple programs by indicating which programs the content rater likes and/or dislikes. As a result, lists of content raters who have certain profiles and recommendations may be of service to other end users who may watch similar content. Such content raters could be well known celebrities or they could be anonymous or otherwise relatively unknown. Some embodiments may allow for sharing or otherwise publishing of lists via social networks and/or multiple service providers.

Certain embodiments assist users to discover content on a video distribution platform. While typical video search engines are inefficient at helping locate content, certain embodiments disclosed herein provide users with better experiences in discovering content. By using viewer ratings and associated viewer characteristics, content desirable to particular viewers can be located more effectively. Other users can access lists and other ratings information in order to discover content, view content, set recordings, etc.

In some embodiments, information about an identified user (such as information about the user's viewing history and/or recordings) could be uploaded to a cloud system for analysis. Such analysis could entail comparing the user information to information about content raters (say, lists that other users have uploaded) in order to recommend content (e.g., lists of others' favorite content) for the identified user to review. Users may have the option to subscribe to or otherwise follow one or more content raters so that the users may watch recommended content. The system may then send indications to television receivers of subscribers regarding options corresponding to the rated content.

Various embodiments will now be discussed in greater detail with reference to the accompanying figures, beginning with FIG. 1.

FIG. 1 illustrates an embodiment of a television program distribution system 100. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

System 100 may include television service provider 102, satellite uplink 104, a plurality of orbiting (e.g., geosynchronous) satellites 106, satellite receiver 108, television receivers 110-1, television receivers 110-2 (that may correspond to users who rate content), one or more public sources 112, one or more catch-up services 114, one or more subscription services 116, one or more (other) television receivers 110-3, mobile device 127, and computer system 128.

A television receiver 110-2 may include a content rating engine 113. The content rating engine 113, in one aspect, may be configured to facilitate content rating. Television receivers 110-2 may correspond to content raters, i.e., users who rate content, rank content, indicate preferences for content, and/or otherwise qualify content in any suitable manner. As used herein, "content rater" is used to include a user who assesses particular content, where such assessments of the content are to be exposed to other users. A "content rater" may include a user who recommends particular content, rates particular content, and/or otherwise indicate preference, approval, and/or disapproval of particular content. In some embodiments, a "content rater" may not necessarily indicate a particular rating, but may otherwise recommend particular content and/or otherwise indicate preference, approval, and/or disapproval of particular content. As used herein, "rating" and "ratings" may include any one or combination of indicia, information, and/or metadata relating to ratings, rankings, preferences, likes, dislikes, approval, qualification, and/or the like. Examples of embodiments directed to content raters, content rating, and content rating engines 113 are disclosed further herein.

A television receiver 110-1 may include a content access engine 111. The content access engine 111 may in one aspect be configured to access multiple local and/or remote content resources. Television receivers 110-1 may correspond to users who follow, are interested in, and/or are otherwise associated with content raters and/or rated content. Examples of embodiments directed such users ("followers"), associations, and content access engines 111 are disclosed further herein.

System 100 may include at least one network 120 that can be used for a bi-directional communication path for data transfer with television receivers 110 and other components of system 100. Network 120 is intended to represent any number of terrestrial and/or non-terrestrial networks and/or network features. For example, network 120 may incorporate or exhibit any number of features or elements of various wireless and/or hardwired packet-based communication networks such as, for example, a WAN (Wide Area Network) network (e.g., the Internet), a HAN (Home Area Network) network, a LAN (Local Area Network) network (e.g., a corporate LAN), a WLAN (Wireless Local Area Network) network, a cellular communications network, and/or any other type of communication network(s) configured such that data may be transferred between and among respective elements of the example system 100.

Television receivers 110, as described throughout, may generally be any type of television receiver (such as an STB (set-top box), for example) configured to decode signals received for output and presentation via a display device. In another example, television receiver 110 (which may include another remote television receiver, such as a television receivers 110-3) may be integrated as part of or into a television, a DVR, a computing device, such as a tablet computing device, or any other computing system or device, as well as variations thereof. In some embodiments, a television receiver 110 may be a component that is added into a display device, such as in the form of an expansion card. A television receiver 110 and network 120 together with television receivers 110-3, mobile device 127, and/or computer system 128, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In some embodiments, broadcast television programs may be delivered to television receivers, including a television receiver 110, via satellite according to a schedule. On-demand content may also be delivered to a television receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by television service provider 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first and second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

Satellites 106 may be further configured to relay uplink signals 122 to satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth.

Satellite receiver 108, which may include a satellite dish, a low noise block (LNB), and/or other components, may be provided for use to receive television channels, such as on a subscription basis, distributed by television service provider 102 via satellites 106. For example, satellite receiver 108 may be configured to receive particular transponder streams as downlink signals 124, from one or more of the satellites 106. Based on the characteristics of a television receiver 110 and/or satellite receiver 108, it may only be possible to capture transponder streams from a limited number of transponders of satellites 106 concurrently. For example, a tuner of a television receiver 110 may only be able to tune to a single transponder stream from a transponder of a single satellite, such as satellite 106-1, at a time.

A television receiver 110, which may be communicatively coupled to the satellite receiver 108, may subsequently select, via a tuner, decode, and relay television programming to a television for display thereon. Broadcast television programming or content may be presented "live," or from a recording as previously stored on, by, or at a television receiver 110. For example, an HD channel may be output to a television by a television receiver 110 in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

A television receiver 110 may select via tuner, decode, and relay particular transponder streams to one or more of television receivers 110-3, which may in turn relay particular transponder streams to display devices. For example, satellite receiver 108 and a television receiver 110 may, respectively, be configured to receive, decode, and relay at least one television channel to a television by way of a television receiver 110-3. Similar to the above-example, a television channel may generally be presented "live," or from a recording as previously stored by a television receiver 110, and may be output to a display device by way of television receiver 110-3 in accordance with a particular content protection technology and/or networking standard. Other embodiments are possible.

Content resources 126 may be used to provide a television receiver 110 with content (e.g. television programming). In particular, content resources 126 may be used to provide followers with content that has been rated by a content rater. For example, a content rater may rate certain content that the content rater has viewed. The rated content may be identified as being available for later access via one or more content resources 126. A user that is matched with the content rater may be notified of the rated content and of the access to the rated content via one or more content resources 126. In some embodiments, rated content may be automatically retained (e.g., recorded or saved by the service provider system for streaming/downloading) for subsequent access by the follower. Content resources 126 may be used to retrieve television programs or portions of television programs following and/or during a live broadcast of the television programs. Content resources 126 may include television service provider 102, public sources 112, catch-up services 114, subscription services 116, and television receivers 110-3. Other forms of content resources are further detailed below.

Television service provider 102, which may distribute broadcast television programming to television receivers 110 via a satellite-based television programming distribution arrangement (or some other form of television programming distribution arrangement), such as a cable-based network or IP-based network, may use an alternate communication path, such as via network 120, to provide television programming to television receivers 110. Television receivers 110 may be permitted to request various television programs or portions of television programs from television service provider 102 via network 120. For instance, television service provider 102 may be permitted to transmit a portion of a television program or an entire television program during and/or after a time at which the television program was broadcast live by the television service provider via a satellite-based television programming distribution arrangement.

In some embodiments, television service provider 102 may provide a television program via on-demand content. On-demand content may be included in a user's subscription or may be provided on a per-request basis. Such on-demand content may be provided via the satellite-based distribution arrangement and/or via network 120. If the on-demand version of the television program requires payment of a fee, before providing the television program to television receiver 110, a user of a television receiver 110 may at least need to agree to payment of the fee. On-demand content provided via the satellite-based distribution arrangement may be stored locally by a television receiver 110 to allow on-demand access. On-demand content may also be retrieved via network 120 from television service provider 102.

Mobile device 127 and computer system 128 represent computerized devices associated with a user of television receiver 110. Mobile device 127 may be a cellular phone, smartphone, tablet computer, or other form of computerized device. Computer system 128 may represent a laptop computer, desktop computer, home server, or other form of computerized device. Television receiver 110 may be provided with access credentials that allow access to content stored and/or accessible through mobile device 127 and/or computer system 128. It should be understood that mobile device 127 and computer system 128 are exemplary in nature. Content may be accessible through a fewer or greater number of computerized devices associated with a user of a television receiver 110.

Public sources 112 represent content resources through which television programs may be retrieved by a television receiver 110 via network 120. Television programming available through public sources 112 may be available for free and not require subscription (a username and/or password may or may not be necessary). Each of public sources 112 may represent different websites available via the Internet. For example, some television programming may be legally made available for free (such as television programming provided by government-funded sources, e.g., the BBC or Hulu®). Periodically, a television receiver 110 may poll public sources 112 to determine which television programs are available and/or which television programs are scheduled to be available in the future. In some embodiments, a television receiver 110 may poll public sources 112 regarding the availability of at least a portion of a specific television program. While two examples of public sources 112 are illustrated, it should be understood that a television receiver 110 may have access to more or fewer public sources 112. In some embodiments, the television receiver 110 may receive over-the-air broadcasts by an off-air antenna (which may be included in the television receiver 110 or otherwise coupled to the television receiver 110) from a local broadcast tower.

Catch-up services 114 represent content resources through which television programs may be retrieved by a television receiver 110 via network 120. Television programming available through public sources 112 may be available for free and not require subscription (a username and/or password may or may not be necessary). Some catch-up services may require a subscription and may require user authentication. Catch-up services 114 may only make a television program available during the live broadcast of the television program. For example, a catch-up service authorized or run by a television channel (e.g., NBC) or television program production company may make at least a portion of a television program available for streaming or download during a live broadcast scheduled time slot. Therefore, a user may be permitted to watch a missed portion of a live broadcast television program via a catch-up service, but may not be permitted to view the entire television program via the catch-up service at a later time. In some embodiments, television programs may be available via a catch-up service for up to a fixed period of time after the live broadcast of the television program or indefinitely (e.g., until the catch-up service provider decides to remove accessibility to the television program). Periodically, a television receiver 110 may poll catch-up services 114 to determine which television programs are available and/or which television programs are scheduled to be available in the future. In some embodiments, a television receiver 110 may poll catch-up services 114 regarding the availability of at least a portion of a specific television program. While two examples of catch-up services 114 are illustrated, it should be understood that television receivers 110 may have access to more or fewer catch-up services 114.

Subscription services 116 represent content resources through which television programs may be retrieved by television receivers 110 via network 120. Television programming available through subscription services 116 may require a paid subscription and may require a username and/or password be provided. Each of subscription services 116 may represent different websites available via the Internet. For example, some television programming may be legally made available via a service operated by a television channel or authorized agent of the television channel or television program production company. Periodically, a television receiver 110 may poll subscription services 116 to determine which television programs are available and/or which television programs are scheduled to be available in the future. In some embodiments, a television receiver 110 may poll subscription services 116 regarding the availability of at least a portion of a specific television program. While two examples of subscription services 116 are illustrated, it should be understood that television receiver 110 may have access to more or fewer subscription services 116.

A television receiver 110 may be able to retrieve at least a portion of a television program through other television receivers 110-3, which can function as content resources. For instance, a Slingbox® (or other form of media streaming device) functioning in concert with a television receiver may permit television programs to be captured and streamed over network 120. In some embodiments, television receivers 110-3 may have such media streaming capabilities integrated. A user may be able to obtain at least a portion of a television program via television receivers 110-3, which may be associated with other users or with the same user. For instance, the user may have multiple television receivers at different locations. Periodically, television receiver 110 may poll television receivers 110-3 to determine which television programs are available and/or which television programs are scheduled to be available in the future. In some embodiments, television receiver 110 may poll television receivers 110-3 regarding the availability of at least a portion of a specific television program. While two examples of television receivers 110-3 are illustrated, it should be understood that television receiver 110 may have access to more or fewer television receivers 110-3.

The above description has focused on how network configuration data may be broadcast repeatedly via satellite to television receivers. It should be understood that a similar arrangement may be used in cable-based television programming broadcast networks to broadcast network configuration. For either type of network, it may be possible to transmit other forms of data via an Internet-based network connection rather than using the television service provider's proprietary network. For instance, EPG data may be transmitted to television receivers via a network (e.g., Internet) connection. As another example, firmware and/or software updates may be transmitted on demand to a television receiver via the Internet rather than the television receiver receiving the update via the television programming broadcast network.

Figure 2:
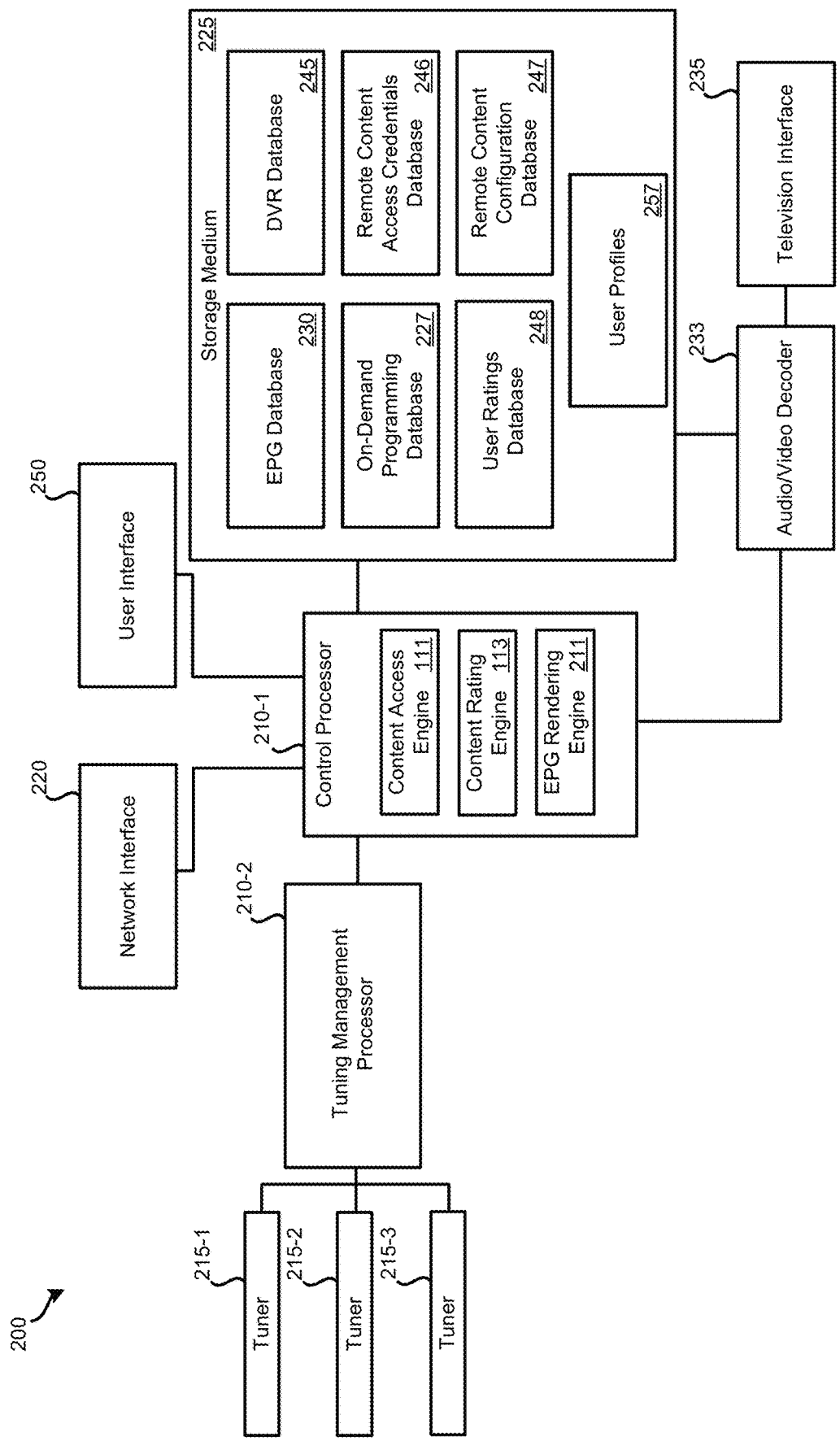
FIG. 2 illustrates a block diagram of an embodiment of television receiver that is configured to facilitate content rating and/or assisting users to locate content of interest based at least in part on viewer ratings, in accordance with certain embodiments of the present disclosure.

FIG. 2 illustrates a block diagram of an embodiment of television receiver 200 that is configured to facilitate content rating and/or assisting users to locate content of interest based at least in part on viewer ratings, in accordance with certain embodiments of the present disclosure. Television receiver 200 may represent one or more television receivers of FIG. 1 and may be in the form of an STB that communicates with a display device such as a television or monitor. Television receiver 200 may be incorporated as part of a television. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, digital video recorder (DVR) database 245, on-demand programming 227, user interface 250, audio/video decoder 233, remote content access credentials database 246 and/or remote content configuration database 247. In other embodiments of television receiver 200, fewer or greater numbers of components may be present. It should be understood that the various components of television receiver 200 may be implemented using hardware, firmware, software, and/or some combination thereof. Functionality of components may be combined.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors.

Control processor 210-1 may communicate with tuning management processor 210-2. Control processor 210-1 may control the recording of television channels based on timers stored in DVR database 245. Control processor 210-1 may initiate recording of a television channel by sending a record command along with an indication of the television channel to be recorded to tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle incoming data from network interface 220 and user interface 250. Additionally, control processor 210-1 may be configured to output data via network interface 220.

Tuners 215 may include one or more tuners used to tune to transponders that include broadcasts of one or more television channels. In some embodiments, two, three, or more than three tuners may be present, such as four, six, or eight tuners. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 to which frequencies to tune.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, a television receiver 110 may be able to communicate with television service provider 102 via a network, such as the Internet. This communication may be bidirectional: data may be transmitted from television receiver 110 to television service provider 102 and from television service provider 102 to television receiver 110. Referring back to FIG. 2, network interface 220 may be configured to communicate via one or more networks, such as the Internet, to communicate with television service provider 102 of FIG. 1. Information may be transmitted and/or received via network interface 220. For example, ratings information, descriptive content indicative of content raters, information corresponding to selections/input of followers, information corresponding to selections/input of content raters, and/or the like may be transmitted and/or received via network interface 220. Network interface 220 may also be used to query and/or receive data from various content resources 126 available to television receiver 110. For example, network interface 220 may be used to retrieve at least portions of television programs from public sources 112, catch-up services 114, subscription services 116, television receivers 118, mobile device 127, and/or computer system 128.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, DVR database 245, on-demand programming database 227, remote content access credentials database 246, and/or remote content configuration database 247. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored of television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 106 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously. Data from EPG database 230, which may be used in combination with other information (such as information about which television programs can be retrieved via network interface 220 and/or information about television programs stored in DVR database 245) may be used to present a user with a graphical EPG via a display device, such as a television.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

Audio/video decoder 233 may serve to convert encoded video and audio into a format suitable for output to a display device. For instance, audio/video decoder 233 may receive MPEG video and audio from storage medium 225 to be output to a display device. MPEG video and audio from storage medium 225 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user. Such user-defined television programming may be recorded based on user-defined timers. Each user-defined timer is set by a user and specifies a date, television channel, and a time period for recording. To create a user-defined timer, a user may select a particular television program via a graphically-displayed EPG. Based on the date, time period, and television channel indicated by EPG database 230, control processor 210-1 may record the associated television program to a user-managed television programming storage portion of DVR database 245.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to system 100 of FIG. 1, in a satellite-based television service provider system, data necessary to create the provider-defined timers at television receiver 110 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on certain channels on each weeknight and from 6 to 10 PM on each weekend night on the same channels. Television programming recorded based on provider-defined timers may be stored to a provider-managed television programming storage portion of DVR database 245.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. In some systems, such as cable and IP-based television distribution networks, on-demand content is requested by a television receiver and retrieved from a remote server in response to a user requesting the on-demand content. In other systems, such as systems in which bandwidth is at a premium and/or communication to the television receiver is one-way (e.g., satellite-based television distribution networks), on-demand content may be pre-loaded to a television receiver for the possibility of a user requesting the on-demand content. On-demand content may be "free" (e.g., included in the cost of a user's subscription with the television service provider) or may be pay-per-view (e.g., a movie that costs an amount of money to be viewed). On-demand programming database 227 may not be user-selected. As such, the television programming stored to on-demand programming database 227 may be the same for each television receiver of a television service provider. In some embodiments, programming stored to on-demand programming database 227 may be standardized based on a manufacturer and/or model of television receiver (e.g., television receivers of the same make and/or model store the same on-demand programming). What on-demand programming and for how long such on-demand programming is retained by the television receiver may be determined based on settings propagated by the television service provider. However, in some embodiments, a service provider can carousel an assortment of content, and a user can select which content he wants to download based on limited hard drive space.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Remote content access credentials database 246 may store data, such as usernames and passwords, that permit television receiver 200 to access one or more remote content resources. For example, referring to FIG. 1, a username and password (or other form of credentials) may be required for television receiver 110 to access subscription services 116 or another content resource of content resources 126. A user may be permitted to provide and/or update credentials to television receiver 200 that are stored using remote content access credentials database 246.

Remote content preference database 247 may be used to store television service provider preferences and/or user preferences on the access of content resources 126. Remote content preference database 247 may identify a priority listing of an order in which content resources should be checked and/or in which content should be retrieved from content resources. For instance, if a piece of content is available from multiple sources, the content resource with the higher priority should be used. It should be understood that at least some of the preferences in remote content preference database 247 may be specified by the television service provider.

In an exemplary remote content preference database 247, a priority ranking may be present which may indicate the order in which content resources should be checked and/or in which content should be retrieved from content resources. A user may specify content resources, in some embodiments. In addition or in the alternative, a television service provider (which may have a contract with one or more content resources) may add content resources to a television receiver's remote content preference database 247. Content resources may include those as defined in relation to content resources 126. For example, content resources may include a DVR database of the television receiver, the television service provider, one or more catch-up services (e.g., http://catchup.tv), a subscription service (e.g., http://subscription-service.tv), another television receiver or content recording device (e.g., Joe's Media Grabber), etc.

Any access credentials required may be stored, such as by remote content access credentials database 246 or may be prompted from the user when access is attempted. Some sources may require specific user permission to proceed. For example, specific user permission may be required when the user is going to be billed for access to a service.

Control processor 210-1 may have a content rating engine 113 that is configured to facilitate content rating by a user in accordance with various embodiments disclosed herein. The content rating engine 113 may be configured with logic to process, analyze, retrieve, pull, cause transmission of, derive, compile, aggregate, categorize, characterize, rank, handle, store, report, and/or present any suitable information/content pertaining to content raters. The content rating engine 113 may be configured to generate user interfaces that allow a user to provide feedback on specific content that a user liked or disliked. The content rating engine 113 may be configured to solicit and process feedback received from a user for content. For example, the content rating engine 113 may be configured to present information and user-selectable options to allow for content rater profile creation, profile modification, content rating, content recommendation, and/or the like. The content rating engine 113 may be configured to process selections and other input in response to such options. The content rating engine 113 may be configured to cause the ratings information to be transmitted to the service provider system 110 for analysis to assist other users to locate content of interest based at least in part on content ratings. Such information may be provided to a television service provider via network interface 220. Additionally, in some embodiments, ratings information may be stored to user ratings database 248.

Control processor 210-1 may have a content access engine 111 that is configured to facilitate content access by a user in accordance with various embodiments disclosed herein. The content access engine 111 may be configured to query and retrieve content from content resources via network interface 220 in accordance with data in remote content access credentials database 246 and remote content preference database 247. The content access engine 111 may be configured to provide followers with access to content that has been rated by a content rater. For example, by way of the content rating engine 113 associated with a content rater, the content rater may rate certain content, and ratings information may be transmitted to the service provider system. The rated content may be identified as being available for later access via one or more content resources 126. By way of a content access engine 111 associated with a user that is matched with the content rater, the user may be notified of the rated content and of the access to the rated content via one or more content resources 126.

User profiles 257 may include stored user preferences. For example, a user may specify a preferred category of television programming, such as: sports, news, movies, sitcoms, reality, etc. The user may also specify whether they prefer broadcast ("live") television, on-demand programming, or recorded television programming (via user or provider defined timers). In some embodiments, data for a user's profile may be defined based on measured viewing habits, such as which television channels and/or categories of television programming does the user watch. User profiles 257 may specify which television programs were recorded based on timers set by the user associated with a specific user profile.

User profiles 257 may include profiles for multiple users or may include a single profile for the television receiver in general. In some embodiments, a user is permitted to select which user profile of user profiles 257 is active. For instance, a user can log on to television receiver 200. User profiles may include preferences for customized channels programming. The user profiles may further include user feedback received from the user regarding programming on the customized channel. The feedback data may be used to refine the programming and schedule of the customized channel. User profiles 257 may allow for multiple users associated with a particular account, a particular television receiver, and/or a particular television to be differentiated. Thus, the multiple users (e.g., members of a houseld) may each be distinct followers and/or content raters, though the users make use of the same account, television, and/or television receiver.

Control processor 210-1 may have an EPG rendering engine 211 that may be configured to cause an EPG to be output that is based on data from EPG database 230 and information about the availability of at least portions of television programs via content resources indicated in remote content configuration database 247. For instance, control processor 210-1 may control presentation attributes of each television program indicated in a presented EPG, such as a status bar and presentation color. In some embodiments, the content rating engine 113 may work in conjunction with the EPG rendering engine 211 to facilitate, via an EPG, the provision of content rating options and/or acquisition of input by content raters, in accordance with various embodiments disclosed herein.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
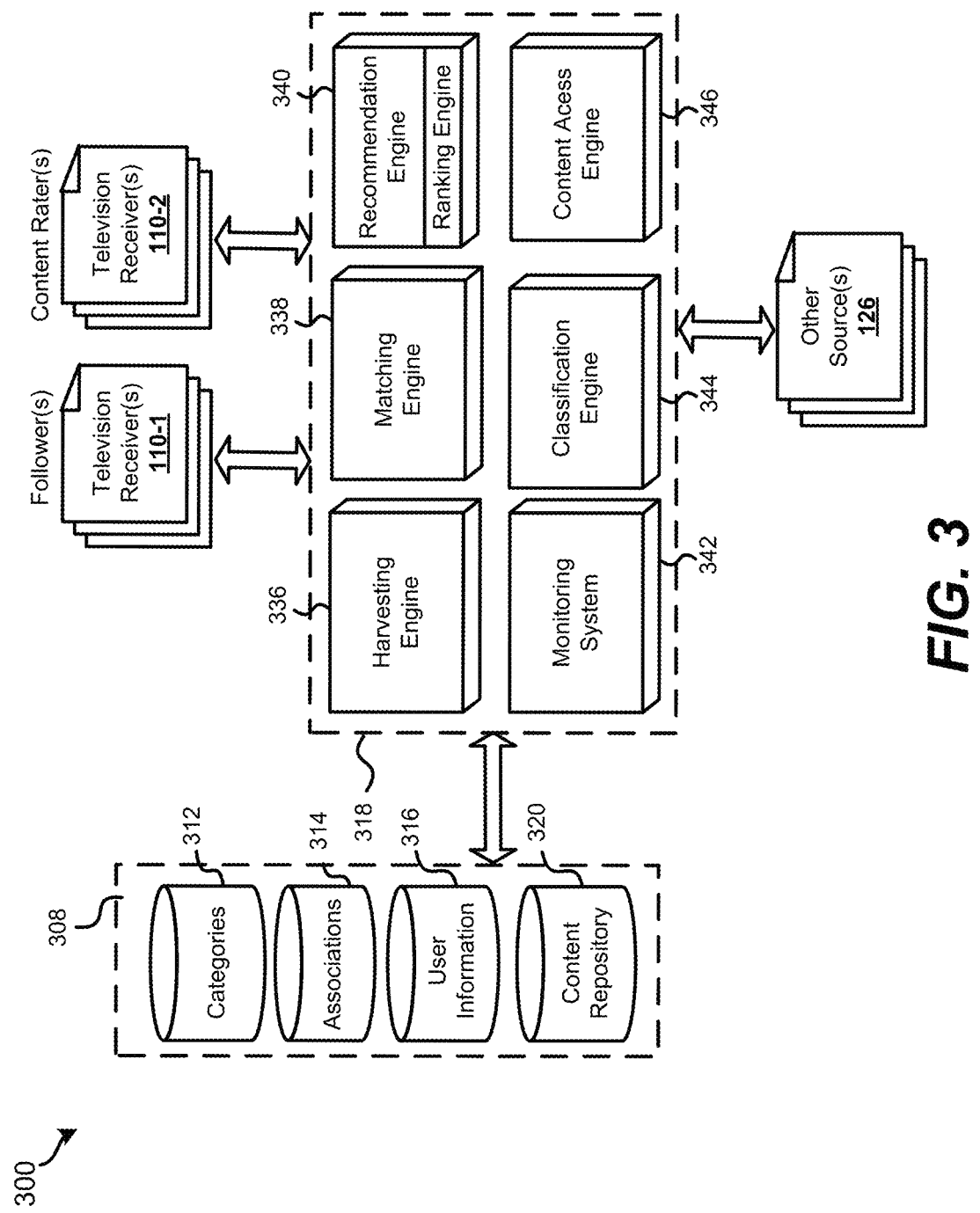
FIG. 3 is a simplified illustration of an embodiment of an information handling system, in accordance with certain embodiments of the present disclosure.

FIG. 3 is a simplified illustration of an embodiment of an information handling system 300 that may facilitate content rating and discovery, in accordance with certain embodiments of the present disclosure. In certain embodiments, the information handling system 300 may be included in the television service provider 102. In certain embodiments, the content handling system 300 may be separate from, and provide information to, the television service provider 102. In certain embodiments, certain aspects of the information handling system 300 may be included in one or more television receivers 110. In certain embodiments, various features of the information handling system 300 may be distributed between one or more television receivers 110 and system components upstream of the television receiver 110.

The information handling system 300 may include one or more servers. The one or more servers may include one or more network interfaces communicatively coupled to processors. The network interface(s) may include any suitable input/output module or other system/device operable to serve as an interface between one or more components of the information handling system 300, the network 120, and other components of system 100. The information handling system 300 may use the network interfaces to communicate via network using any suitable transmission protocol and/or standard. In some embodiments, the one or more servers may include one or more web servers, one or more email gateways, one or more instant messaging gateways, one or more telephone gateways, one or more other gateways, such as television gateways, and/or one or more other types of servers, such as an application gateway to interface with different servers.

The information handling system 300 may include one or more information repositories 308. In various embodiments, the information repositories 308 may be implemented in various ways. For example, one or more data processing systems may store information. One or more relational or object-oriented databases, or flat files on one or more computers or networked storage devices, may store information. In some embodiments, a centralized system stores information; alternatively, a distributed/cloud system, network-based system, such as being implemented with a peer-to-peer network, or Internet, may store information. The information repositories 308, which may include category information repository 312, association information repository 314, user information repository 316, and content information repository 318 may retain any suitable information to facilitate certain features disclosed herein. By way of example, user information may include any one or combination of user account information, contact information (such as linked email account information, telephone information, etc.), notification preferences (such as whether the user has accepted email notifications, push notifications, text message notifications, etc. as means of relaying information corresponding to rated content), user profile information (such as information relating to different user profiles set up for different members of a family), viewing preferences, location information, user viewing intelligence data, end-user device/configuration information, and/or the like. Other types of information are disclosed further herein with further description of embodiments using features directed to categories, associations of users and content with certain categories, associations of followers with content raters, user- and system-provided content, ratings information, and/or the like.

One or more of engines, modules, and systems 318 may be configured to perform any of the steps of methods described in the present disclosure. While certain components may be described separately, it should be understood that such components may be implemented in any suitable manner. The information handling system 300 may include a harvesting engine 336 configured to harvest information about users. The harvesting engine 336 may work in conjunction with television receivers to gather information on user profiles, user ratings of content, user preferences, user characteristics, followings, and/or the like. The harvesting engine 336 may be configured to perform any one or combination of features directed to facilitating data capture regarding content, ratings informations, and users (e.g., content raters and followers) disclosed herein. The harvesting engine 336, for example, may capture data about user selections, viewing history, explicit user preferences, and/or the like.

The information handling system 300 may include a matching engine 338 configured to perform any one or combination of features directed to matching or otherwise correlating information about users, ratings, and content disclosed herein. For example, in some embodiments, the matching engine 338 can receive content rater information, identify attributes of the content rater based at least in part on the content rater information, and match the content rater to one or more categories from a category information repository 312. As another example, in some embodiments, the matching engine 338 could match a user to one or more content raters based at least in part on correlating categories.

The information handling system 300 may include a classification engine 344 configured to perform any one or combination of features directed to classify or otherwise categorizing users, ratings, and content disclosed herein. In some embodiments, the matching engine 338 may include the classification engine 344; in other embodiments, the two engines may be separate but work in conjunction with one another.

The information handling system 300 may include a recommendation engine 340 configured to perform any one or combination of features directed to facilitating recommendations for content raters and/or other users (e.g., followers) disclosed herein. For example, the recommendation engine 340 may generate recommendations as to which content raters a user might want to follow. As another example, the recommendation engine 340 may assess possible recommendation options (e.g., from a portfolio of content raters associated with a particular follower) and generate recommendations as to which rated content from a subset of the options the follower might want to watch. In some embodiments, the recommendation engine 340 may include a ranking engine to rank options (e.g., to rank the picks of the portfolio of content raters).

The information handling system 300 may include a content access engine 346 configured to perform any one or combination of features directed to facilitating content access disclosed herein. The content access engine 346, for example, may work with a content access engine 111 of a television to facilitate content access from one or more resources 126. The information handling system 300 may include a monitoring system 342 configured to monitor any suitable aspects pertaining to end users. For example, the monitoring system 342 may process information enabling unique identification of users and information about end-user actions (e.g., actions responsive to recommendations).

By way of example without limitation, various aspects of the system 300 may facilitate corresponding features described with the following.

Figure 4:
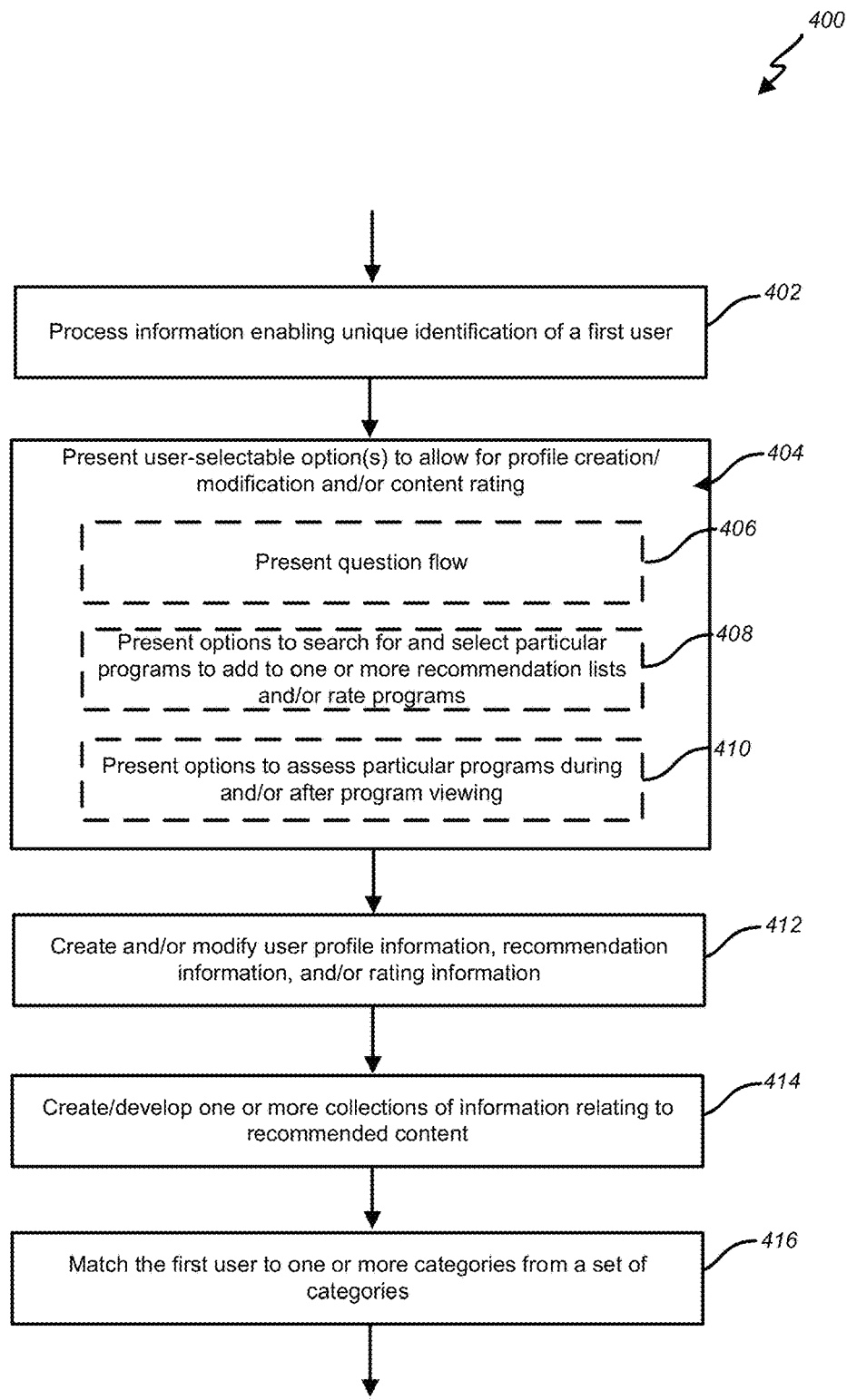
FIG. 4 is a block diagram that illustrates an example method of certain features directed to user-specific profiles, in accordance with certain embodiments of the present disclosure.

FIG. 4 is a block diagram that illustrates an example method 400 of certain features directed to user-specific profiles, in accordance with certain embodiments of the present disclosure. Certain aspects of the method 400 may provide for an onboarding process whereby a user may setup a profile associated with the system. In some embodiments, the method 400 may be directed to a profile of a content rater. In addition or in alternative, the method 400 may be directed to a profile of a user that may follow one or more content raters in some embodiments.

According to certain embodiments, the method 400 may begin as indicated by block 402. Teachings of the present disclosure may be implemented in a variety of configurations. As such, the order of the steps comprising the method 400 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

For sake of simplicity, the following features are disclosed herein with respect to individual users. However, it should be understood that certain aspects of the method 400 may be used to create profiles for a multitude of users who wish to be content raters that make their recommendations and/or ratings public to a multitude of other users of the video distribution platform to help those others identify and access content of interest. A first user may correspond to a content rater and/or recommender (or a user who wishes to become a content rater and/or recommender).

As indicated by block 402, information enabling unique identification of a user may be processed. By way of example, the monitoring system 342 of the service provider, being in communication with a particular set of one or more television receivers, may uniquely identify the first user associated with the set of television receivers. In some embodiments, the first user may correspond to any user or multiple users associated with a particular account and/or set of one or more television receivers. In some embodiments, the first user may correspond to a particular user (e.g., a particular user of a household) and could be identified via user selection/input of information through a television receiver. Any suitable user-selectable options could be presented to allow for a particular user to input identification information through the television receiver, which information may then be transmitted to the service provider system for verification against user information retained by the service provider system. The service provider system may uniquely identify the first user based at least in part on any one or combination of account information, receiver identification information, user-provided information, and/or the like.

In various embodiments, as indicated by block 404, one or more user-selectable options may be presented to the user to allow for profile creation, profile modification, and/or content rating. Options may be provided for the user to confirm that the user wished to publish certain aspects of the user's profile for searching and/or sharing. In some embodiments, the content access engine 111 may facilitate profile creation and profile modification. In some embodiments, the content rating engine 113 may facilitate content recommendation and/or content rating. User-selectable options may be presented in any suitable way, and may be implemented in various forms in various embodiments. For example, a television receiver may provide user-selectable options for display with an on-screen selection option, an on-screen menu, along with an EPG screen, a pop-up, and/or the like. In addition or in alternative, one or more user-selectable options may be available via a dedicated button on a remote control in communication with the television receiver, via a specialized application on a computerized user device (e.g., a tablet computer) in communication with the television receiver, and/or via a website or mobile app made available in connection with the user's account by the service provider. In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like.

In some embodiments, as indicated by block 406, one or more questions may be presented to the user to gauge any one or combination of a user's viewing interests, viewing habits, recommended content, content ratings, characteristics, etc. For a follower, the information gathering may focus on viewing interests, viewing habits, user characteristics, etc. For a content rater, the information gathering may include focus on recommended content, content ratings, etc. In certain embodiments, an automated question flow may present a series of questions presented to the user, the answers to which, as provided by user selections, may indicate profile information. However, with some embodiments, such a question flow may be optional such that a user may bypass it.

In addition or in the alternative, as indicated by block 408, options could be provided for a user to search for and select particular programs that the user (i.e., a content rater) may wish to add to one or more recommendation lists and/or rate. The search interface could allow for access to the backend system to retrieve information about particular programs responsive to user searches. Such information may be presented to the user with options to recommend particular programs, add particular programs to certain recommendation lists, rate particular programs, and/or add user-generated content about particular programs (such as commentary). With some embodiments, system-generated content could be added to user-designated lists or other recommendations. System-generated content could include updates regarding programs, such as viewing options for programming corresponding to the lists or other recommendations. In some embodiments, a television receiver may receive a catalog of available rated content, content raters, lists of rated content, descriptive information on content, categories, recommendations, and/or the like.

As one possible example out of many possibilities, a user could create a recommended list of war shows by searching for and selecting descriptive content about the particular shows. Rating options could be provided to allow the user to assign a rating to each particular show. Any suitable type of approval/disapproval indicators could be used in various embodiments, which indicators may be in form of likes, dislikes, thumbs-up, thumbs-down, star-scale ratings, number-scale ratings, and/or the like. Features could also be provided to the user to allow the user to provide user-generated content to be retained with one or more lists of recommendations. For example, a user could add commentary to particular recommendations and/or generally to a list of recommendations. A user could also add content to the user profile that is about the user (e.g., certain biographical information, demographic information, interests, characteristics, location information, images, etc. to customize aspects of the user's profile which may be shared with other viewers).

As indicated by block 410, one or more user-selectable options may be presented to allow a user to assess particular programs as the user is viewing the programs and/or after the user has viewed the programs. The content rating engine 113 and/or the EPG rendering engine 211 could facilitate provision of content rating options and/or acquisition of input by content raters. As disclosed herein, the user-selectable options may be presented in any of various suitable ways to allow a content rater to assess particular programs, e.g., by way of any one or combination of on-screen selection options, menus, EPG options, pop-ups, dedicated remote control options, specialized applications, website options, mobile app options, and/or the like.

Figure 5:
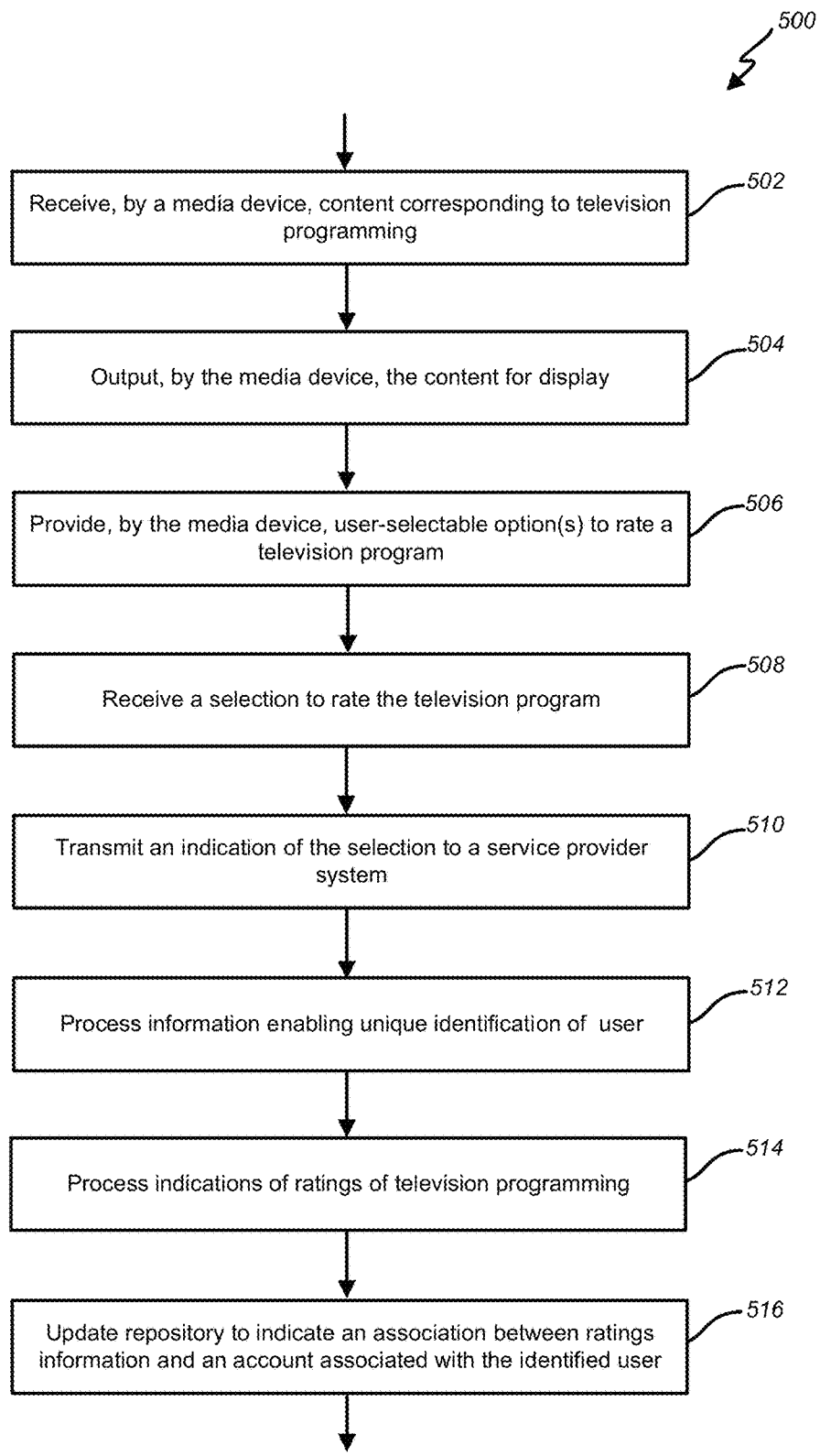
FIG. 5 is a block diagram that illustrates an example method of certain features directed to content rating, in accordance with certain embodiments of the present disclosure.

FIG. 5 is a block diagram that illustrates an example method 500 of certain features directed to content rating, in accordance with certain embodiments of the present disclosure. In some embodiments, features of the method 500 may be available to a content rater after the content rater has gone through an onboarding process (such as certain aspects of method 400). In some embodiments, features of the method 500 may be available to a content rater as part of the onboarding process (e.g., as related to aspect 410 of method 400, where options for assessing particular programs are presented). In some embodiments, features of the method 500 may be available to a content rater that has not gone through an onboarding process.

As indicated by block 502, content corresponding to television programming may be received by a media device. As indicated by block 504, the content may be output by the media device for display. As indicated by block 506, one or more user-selectable options to rate a television program may be provided by the media device. As indicated by block 508, a selection to rate the television program may be received. As indicated by block 510, an indication of the selection may be transmitted. The transmission may be direct to the service provider system or another information handling system. As indicated by block 512, information enabling unique identification of the user may be processed. As indicated by block 514, indications of ratings of television programming may be processed. As indicated by block 516, a repository may be updated to indicate an association between ratings information and an account associated with the identified user.

Referring again to FIG. 4, as indicated by block 412, user profile information, recommendation information, and/or rating information may be created and/or modified, responsive to user selection of the one or more user-selectable options. In some embodiments, the user profile may be created automatically for the user, and user may be able to thereafter customize the profile. A user profile may include persistent information that is maintained about an end user. A user profile may include any data pertinent to the user that is stored, whether or not it is part of the profile as shown to an end user. A profile creation utility may include various features for identifying a user's viewing interests, viewing habits, recommended content, content ratings, and/or characteristics of the viewer (such as demographic information).

As indicated by block 414, one or more collections of information relating to recommended content may be created or developed. In some embodiments, collection creation/development could be based at least in part on responses and/or selections received from the content rater per the question flow. The one or more collections of information could include one or more recommendation lists. Collections may be based on user-specified criteria. In some embodiments, certain collections may be automatically generated for a content rater. Rated content may not only be associated with a particular content rater, but also could be automatically categorized based at least in part on classification of the rated content. Any suitable attributes of the rated content could be identified. By way of example, attributes of the rated content could include the types of television programming (e.g., series, movie, live event), the duration of programs, the genre of television programming (e.g., drama, comedy, documentary), a rating (e.g., G, PG, PG-13, R), appearing actors/actresses, directors, and/or the like. Other types of characteristics are also possible in other embodiments. Options for customization of collections may be presented to the content rater. Not only may a content rater designate certain programs with respect to ratings/lists, but also features could be provided to the content rater to allow for making and retaining commentary related to content and/or lists of content.

As indicated by block 416, the first user may be matched to one or more categories from a set of categories. In some embodiments, the matching engine 338 can receive content rater information, identify attributes of the content rater based at least in part on the content rater information, and match the content rater to one or more categories from a category information repository 312. In some embodiments, one or more taxonomies that map particular profile information to particular categories may be used in correlating user profile information with one or more categories. A content rater could be correlated to one or more categories on any one or combination of suitable bases. For example, a content rater may be categorized according to viewing preferences (which could be derived from the content rater's ratings), certain biographical information, demographic information, interests, location information, etc.

Some embodiments may allow for matching content raters with other content raters. For example, if it is determined that one or more of the characteristics do not match characteristics associated with one or more categories in the category information repository 312, it may be determined whether one or more of the characteristics match another already categorized content rater. The one or more characteristics can be compared with another content rater. If characteristics matched with a second content rater satisfy a threshold, the content rater can be determined to match with the category of the second content rater. Then, the content rater can be associated with the category of the second content rater.

However, if it is not determined that the content rater characteristics match other content rater characteristics, a representative can provide a manual selection of a category, in some embodiments. In some embodiments, manual selection can be made by a representative associated with the system; in some embodiments, manual selection can be made by the content rater. A manual selection having been made, the content rater can be associated with the selected category. In some embodiments, a user interface with presentation of user-selectable option(s) may be generated to allow for confirmation of the one or more categories. The user interface may be exposed to the content rater for confirmation.

Figure 6:
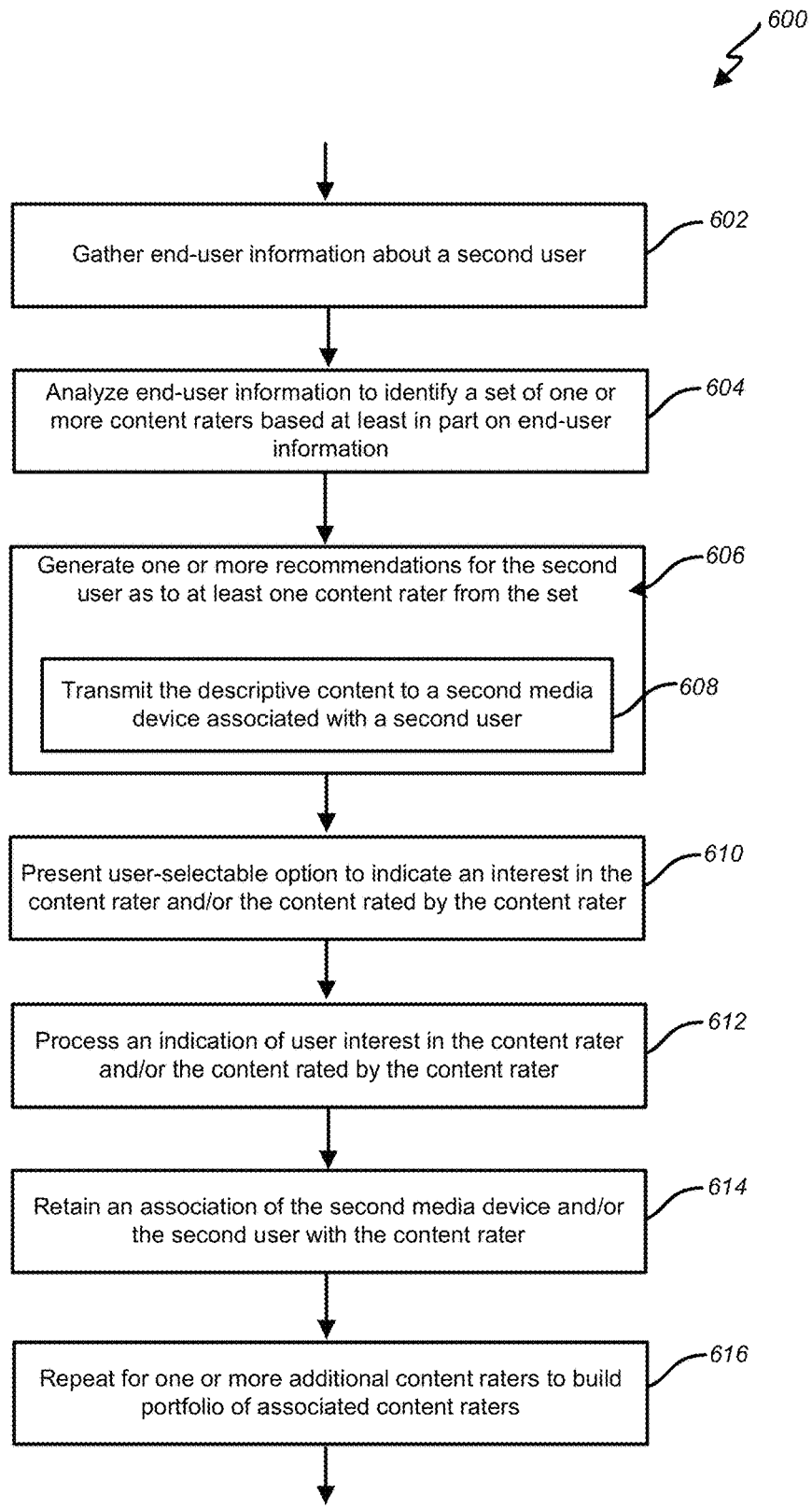
FIG. 6 is a block diagram that illustrates an example method of certain features directed to associating a user with content raters, in accordance with certain embodiments of the present disclosure.

FIG. 6 is a block diagram that illustrates an example method 600 of certain features directed to associating a user with content raters, in accordance with certain embodiments of the present disclosure. As indicated by block 602, end-user information about a second user may be gathered. A second user may correspond to any user who may potentially benefit from a recommendation. In various instances, the second user may correspond to a follower, a content rater, and/or a user who is not yet a follower or a content rater.

The harvesting engine 336, for example, may capture data about user selections, viewing history, explicit user preferences, and/or the like. The data may be transmitted to (pushed to or pulled by) the service provider periodically or on any suitable basis. User preferences may be stored locally by a television receiver or may be stored remotely by the television service provider, and may define the user's viewing preferences regarding content genre, content type, actors, actresses, directors, rating, etc. Compilation of viewing statistics may occur whenever a user has the television receiver outputting television programming. Statistics may be measured and stored by the television receiver and may be based on characteristics of television programming detailed in associated EPG information. For instance, an EPG entry for a television program may indicate whether it is a movie or series (type) and a genre. An entry in a data structure may be maintained for each television program. An entry may only be maintained if a television program has been watched for at least a threshold period of time (e.g., 5 minutes). Accordingly, while a user is watching television via the television receiver, statistics may be compiled by the television receiver as to what the user is watching and how long the user has been watching it.

As indicated by block 604, end-user information may be analyzed to identify a set of one or more content raters based at least in part on at least a subset of the end-user information. The classification engine 334, for example, may analyze and classify the end-user information to determine characteristics of the user's viewing habits. Viewing patterns may be determined (e.g., the user watching the same program multiple times, recording a series, watching once, watching for short time then discontinuing watching, etc.). Content that the user actually views versus just having recorded may be differentiated. Likes and dislikes may be inferred from the end-user information. Any suitable attributes of the user's viewing habits could be identified. By way of example, attributes could include the types of television programming (e.g., series, movie, live event), the duration of programs, the genre of television programming (e.g., drama, comedy, documentary), a rating (e.g., G, PG, PG-13, R), appearing actors/actresses, directors, and/or the like. Other types of characteristics are also possible in other embodiments. In embodiments where the second user is a content rater that could potentially benefit from a recommendation, characteristics of the second user's viewing habits could be identified based on the user's collections, ratings, commentary related to content, and/or lists of content.

In some embodiments, the matching engine 338 could match the user to one or more categories from a category information repository 312. In some embodiments, one or more taxonomies that map particular profile information to particular categories may be used in correlating user profile information with one or more categories. A user could be correlated to one or more categories on any one or combination of suitable bases. For example, the user may be categorized according to viewing preferences, certain biographical information, demographic information, interests, location information, etc.

In some embodiments, the matching engine 338 could match the user to one or more content raters based at least in part on correlating categories. The matching could, in some embodiments, be based at least partially on comparing user attributes/categories with content rater attributes/categories. User attributes/categories could be compared with lists of content raters in some embodiments to identify matches. Any suitable correlation process may be employed. A scoring system could be correlated to the category scheme in some embodiments, such that certain scores correspond to matches of certain categories. Some embodiments may score a match with a numerical expression, for example, a match score. For example, in some embodiments, analysis of end-user information could indicate strong preferences with respect to certain user categories (say, the user is determined to have strong propensity for viewing a certain genre), and relatively higher scores may be assigned to corresponding user and content rater attributes/categories (say, when there is a match as to the certain genre). A high correlation may be identified using any suitable qualification scheme (e.g., a score threshold, a score ranking, etc.).

As indicated by block 606, one or more recommendations may be generated for the second user as to at least one content rater from the set. The recommendation engine 340, for example, could assess matches of the user and one or more content raters. A recommendation could be based on the highest correlation between the user and a content rater. As part of generating the recommendation, descriptive content indicative of a content rater and/or content rated by the content rater may be selected. In some embodiments, the recommendation engine 340 may select the descriptive content in order to form a recommendation for a second user (who may be a follower or a potential follower). The selection could include correlating the second user to the content rater and/or content rated by the content rater based on any or combination of the categories. For example, the second user may be categorized according to viewing preferences, certain biographical information, demographic information, interests, location information, etc. if such information about the second user is known or can be inferred. In some cases, a default recommendation can be selected as a means to suggest that the second user consider the content rating features initially.

As indicated by block 608, the descriptive content may be transmitted to a second media device associated with the second user. As indicated by block 610, one or more user-selectable options to indicate an interest in the content rater and/or the content rated by the content rater may be presented for selection by the second user. In some embodiments, the content access engine 111 of the television receiver of the second user may facilitate the provision of the descriptive content. Options could be provided for a user to search for and select one or more content raters of interest (e.g., that the user may wish to follow) and/or rated content (e.g., that the user may wish to designate as being of interest). The search interface could allow for access to the backend system to retrieve information about particular content raters and/or rated content responsive to user searches. Such information may be presented to the user with options to follow particular content raters or otherwise indicate interest in content raters and/or rated content. In some embodiments, a television receiver may receive a catalog of available rated content, content raters, lists of rated content, descriptive information on content/raters (which may include category information, recommendations, etc.), and/or the like. As indicated by block 612, an indication of user interest in the content rater and/or the content rated by the content rater may be processed.

As one example out of many possibilities, a particular end user may like Gilligan's Island, Godzilla movies, and Shark Tank, and may rate those programs positively. The particular end user may be identified by the system as a content rater having a particular set of viewing preferences. After a content rater has given his permission (e.g., through a user-selectable opt-in options), the content rater's set of preferences may be made available by the system for viewing, searching, and browsing by other end users, who may or may not be content raters. Thus, another end user may be able to view a content rater's viewing preferences and determine whether the content rater's viewing preferences match, align, or otherwise correspond to the end user's viewing preferences. Based on that determination, the other end user may conclude that he might want to watch what the content rater watches. Being interested in content that the content rater is watching, the other user may select an option to follow/subscribe to the content rater.

As indicated by block 614, an association of the second media device and/or the second user with the content rater may be retained. For example, the television receiver may transmit indication of user interest in the content rater and/or the content rated by the content rater to the service provider system, and the service provider system may retain association information in one or more information repositories. As indicated by block 616, the foregoing steps may be repeated for one or more additional content raters to build portfolio of content raters associated with the second user. Accordingly, followers may select a group of content raters as a basis for locating content of interest. The recommendation engine 340 may select a subset of one or more recommendations based on the group of content raters. Recommendations could correspond to top picks out of the portfolio of content raters, for example. In some embodiments, a ranking engine may rank recommendations according to the popularity of content raters. Popularity of a particular content rater could be based at least in part on the number of followers that the particular content rater has and/or on other metrics described further herein. In addition or in alternative, a ranking engine may rank recommendations according to assessing particular recommended content and the particular follower and matching the particular recommended content with the follower based at least in part on one or more categories, in accordance with the category and correlation features described herein.

Figure 7:
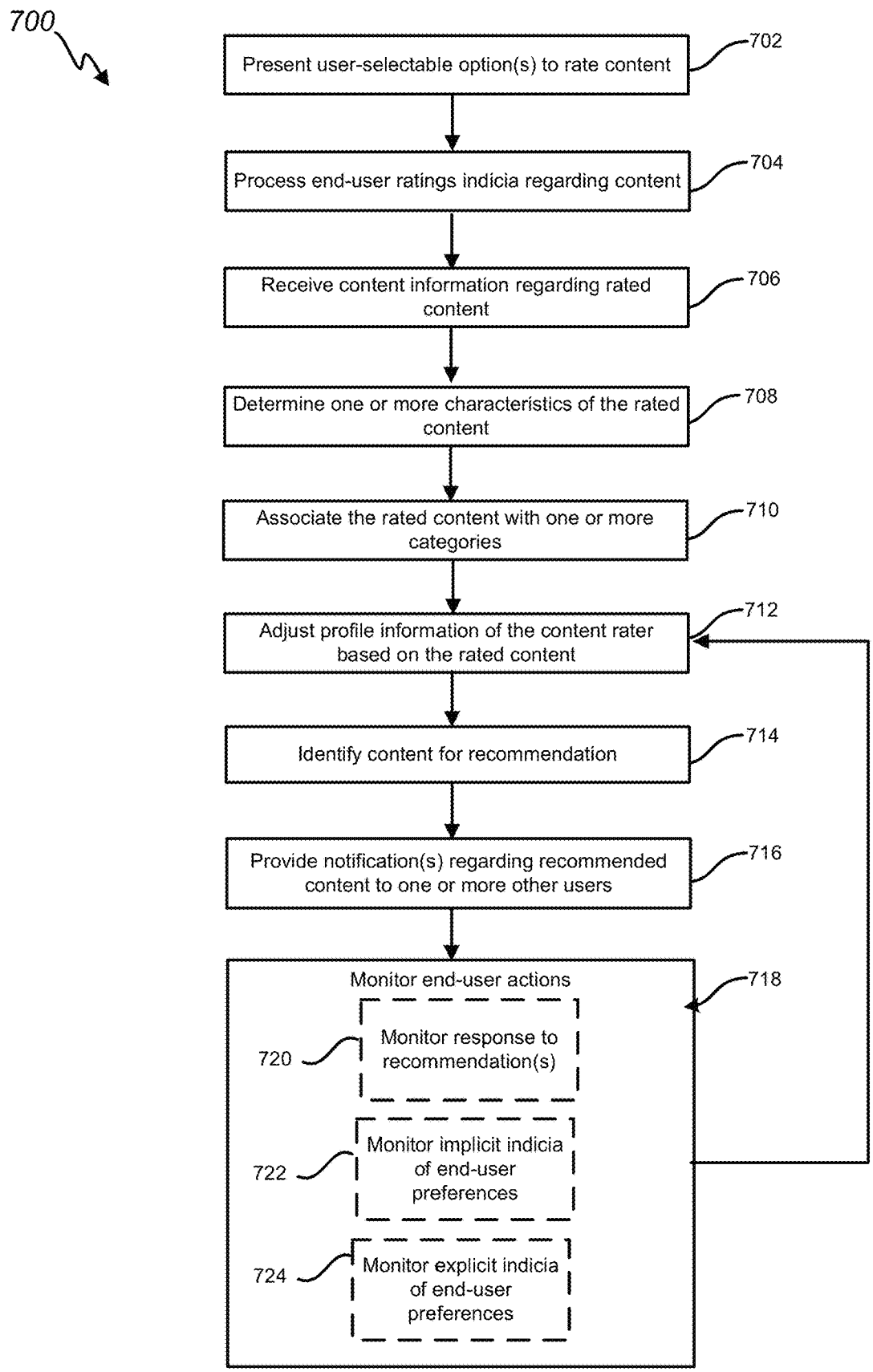
FIG. 7 is a block diagram that illustrates an example method of certain features directed to providing content to a user, in accordance with certain embodiments of the present disclosure.

FIG. 7 is a block diagram that illustrates an example method 700 of certain features directed to providing content to a user, in accordance with certain embodiments of the present disclosure. As indicated by block 702, one or more user-selectable options may be presented to a content rater to allow for the rating of content. As indicated by block 704, additional ratings indicia from a media device associated with the content rater may be processed consequent to the content rater rating content. As indicated by block 706, content information regarding the rated content may be received. The content information may be received and processed, for example, by the harvesting engine 336.

As indicated by block 708, one or more characteristics of the rated content may be determined. As indicated by block 710, the rated content may be associated with one or more categories. The classification engine 344, for example, may classify and categorize the content. As indicated by block 712, profile information of the content rater may be adjusted based at least in part on the rated content. The monitoring system 342, for example, could update the profile to reflect the new ratings information.

As indicated by block 714, content may be identified for recommendation. The recommendation engine 340, for example, may be configured to identify content for recommendation. In some embodiments, all content positively rated by a content rater(s) associated with a follower may be selected for recommendation to the follower. In some embodiments, the assessment of whether content is positively rated may be binary in nature (e.g., if the content rater gave the content an approval indication such as a thumbs-up, an addition to a recommendation list, etc.). In some embodiments, the assessment may entail comparing the rating to a threshold to determine if the rating satisfies the threshold and, hence, if the content was rated to a sufficiently positive extent (e.g., if the content rater gave the content a rating along a scaled rating system, say a 5-star rating system).

In some embodiments, recommendations may be based on selections of certain positively rated content from a group of content raters associated with a follower. In some embodiments, recommendations may be ranked according to the popularity of content raters. Popularity of a particular content rater could be based at least in part on the number of followers that the particular content rater has. A predetermined number of recommendations could be selected at top picks from the portfolio of content raters. In addition or in alternative, recommendations may be ranked according to the correlations that the content raters and/or the rated content has to the follower's attributes/categories. Follower attributes/categories could be compared with attributes/categories of content raters and/or rated content to identify matches. Any suitable correlation process may be employed. Correlations may be identified using any suitable qualification scheme (e.g., a score threshold, a score ranking, etc.). Accordingly, the recommendation engine 340 may be configured to continue to conform to the viewing preferences of the follower based on selected content raters in order to select content that the follower might like.

As indicated by block 716, one or more notifications regarding recommended content may be provided to one or more other users (e.g., followers). In some embodiments, the notifications may include transmitting information to a television receiver, with at least some of the information being provided to a user. Descriptive content indicative of the recommended content may be provided with one or more user-selectable options to access the recommended content, as discussed further herein.

In some embodiments, as indicated by block 718, end-user actions may be monitored. The end-user responses to recommendations could be monitored, as indicated by block 720. End-user actions may be monitored for implicit indicia of end-user preferences, as indicated by block 722. For example, it may be determined whether the user accesses the recommended content. Accessing the recommended content could indicate greater interest. Declining the recommendation could indicate a dislike of the recommendation or simply a lack of interest. Further, it may be determined whether the user not only accesses the recommended content, but also watches all or a significant portion of the content (e.g., based on comparing the portion watched to a threshold). It may be determined whether the user remains subscribed to a content rater for significant length of time and/or after a certain number(s) of recommendations based on the content rater (e.g., satisfying one or more thresholds). It may be determined whether the user upgrades the user's package with the service provider. Any one or combination of such actions and determinations may be correlated to indicia of greater or lesser preference in any suitable manner (e.g., based on a scoring scheme).

Explicit indicia of end-user preferences may be monitored, as indicated by block 724. In some embodiments, followers may be presented with options for providing feedback on recommendations. For example, one or more user-selectable options may also be provided for followers to also rate content that was recommended to them and/or rate content raters. Such rating options may take any suitable form, such as those forms disclosed herein with respect to options presented for content raters.

Information gathered via end-user monitoring may be used to adjust the profile information of the content rater. A content rater may grow in popularity based on the number of end users that subscribe to the viewing preferences of the content rater. The popularity of content raters may also be based on any one or combination of the end-user actions monitored and corresponding indicia of end-user preferences. Content raters may be ranked generally and/or more specifically based on one or more categories such as those disclosed herein. Information on their respective popularity metrics (and metrics relative to other content raters) may be exposed to content raters so that content raters can know their subscriber count and relative popularity (rankings). Information on respective popularity metrics could also be exposed to other users generally (e.g., followers) via content rater profile information for consideration of the other users (e.g., to take popularity into consideration of whether to follow a particular content rater). Incentivizing content raters to grow their popularity may take different forms in various embodiments. In various embodiments, one or more select subsets of top-ranked content raters may be determined and awarded accolades, monetary rewards, bill credits, and/or the like when their respective metrics are determined to satisfy one or more thresholds.

Figure 8:
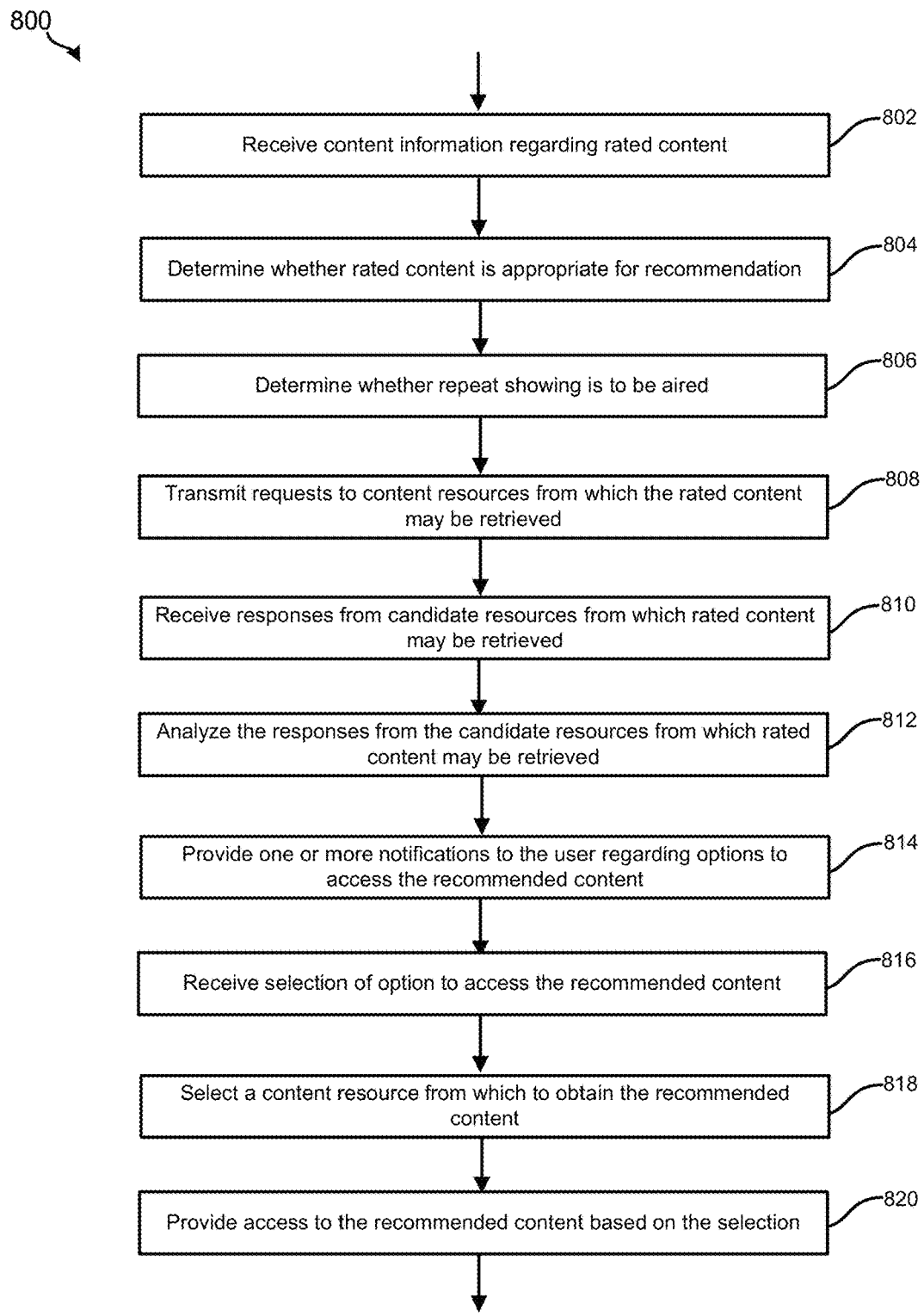
FIG. 8 illustrates an embodiment of a method for identifying recommended content and access thereto, in accordance with certain embodiments of the present disclosure.

FIG. 8 illustrates an embodiment of a method 800 for identifying recommended content and access thereto, in accordance with certain embodiments of the present disclosure. Method 800 may be performed using system 100 of FIG. 1 and/or the television receiver 200 of FIG. 2. It should be understood that method 800 may be performed using other forms of television provider systems (e.g., cable, IP-based) and other forms of television receivers. Each step of method 800 may be performed using a television receiver.

As indicated by block 802, information regarding the rated content may be received. This may correspond, for example, to block 706 in method 700 or similar instances of identifying content rated by a content rater. As indicated by block 804, it may be determined whether the content is appropriate for recommendation. This may entail assessing whether the content was positively rated. Determining whether the content is appropriate for recommendation may also include matching the content to a particular follower. For example, certain followers may have specified with user-selectable options that they only wish to follow certain content raters with respect to certain categories of content. Accordingly, if the category of the content matches categories of interest to a particular follower, then the content may be appropriate for recommendation. Determining whether the content is appropriate for recommendation may include any one or combination of factors and features, such as those disclosed herein.

As indicated by block 806, it may be determined whether a repeat showing is to be aired. Certain programs may have repeat showings. The television receiver and/or the service provider may search for one or more future repeat showings of the program. Further, it may be determined if a staggered broadcast of the television program is available via the television service providers distribution network.

As indicated by block 808, one or more requests may be transmitted to content resources to determine if the content resources have the rated content available for retrieval. In some embodiments, rather than transmitting such a request, a schedule of available content may have been previously obtained from one or more content resources. As indicated by block 810, responses may be received from one or more content resources indicating the availability of the rated content. As indicated by block 812, responses from one or more content resources may be analyzed and/or schedules that indicate the availability of television programs from content resources may be analyzed. A content resource may be a local storage medium, which may have recorded the rated content of one or more of the television programs using DVR functionality of the television receiver. A database may be checked to determine if the rated content of the television program was recorded by the television receiver. Multiple other content resources may be available via a network connection, such as previously described public sources, the television service provider, catch-up services, subscription services, television receivers, and other computerized devices, such as illustrated in FIG. 1.

As indicated by block 814, one or more notifications regarding option(s) to access the recommended content may be provided to the user. For example, corresponding notifications and user-selectable options may be provided for the user in any or combination of ways disclosed herein. In some embodiments, presentation of the EPG may be configured to include indications of the availability of the recommended content. Recommendations could be inserted into the EPG and/or into the display when the user is channel surfing (i.e., viewing multiple programs for short periods of time less than a certain threshold). Recommendations could be based on the content currently represented in the EPG and/or currently viewing. For example, a recommendation could be along the lines of content rater X recommends that if you like this content Y, you ought to watch Z.

As indicated by block 816, a user may select an option to access the recommended content, such as via a remote control in communication with the television receiver. The selection received by the television receiver may trigger retrieval of the recommended content from a content resource determined to have the recommended content (and/or may trigger scheduling of retrieval (e.g., for future recording, streaming, etc. of content anticipated to become available from a content source).

As indicated by block 818, a content resource is selected from which the recommended content is to be retrieved. In some embodiments, if multiple content resources have the recommended content available, the user may be prompted to select from which content resource to retrieve the recommended content. In some embodiments, one of multiple content resources having the recommended content may be automatically selected (e.g., based on promptness of availability, response time, minimal cost, quality, etc., or based on user preferences). As indicated by block 820, access to the recommended content may be provided based on the selection (e.g., via downloading, streaming, recording, etc.).

In some embodiments, the television receiver of a follower and/or one or more content resource may be configured to automatically record all or a subset of programming that matches content rater's preferences and retain the content for a time to allow for recommendation to the follower and for the follower to consider the recommendation. In some embodiments, such automatically recorded programming may be retained only if the content rater rates the programming positively.

Figure 9:
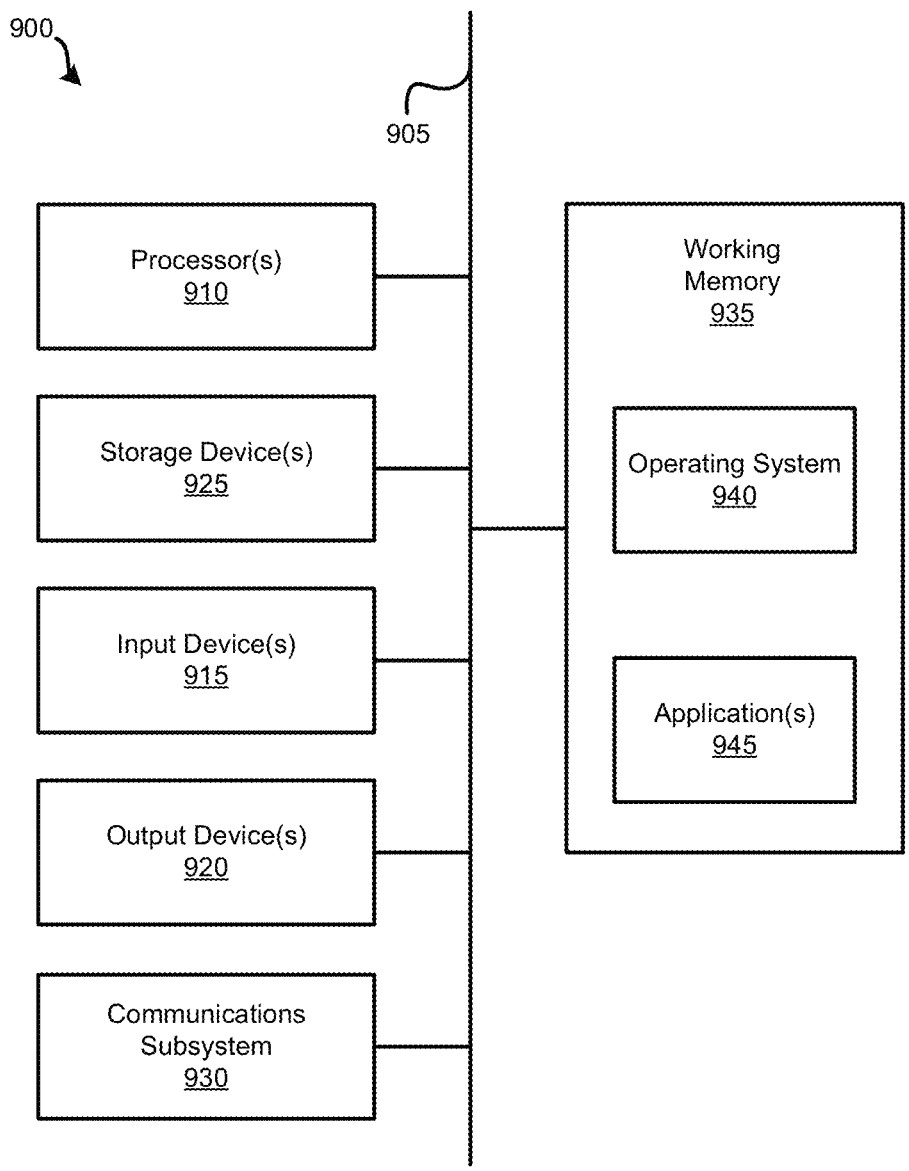
FIG. 9 illustrates an embodiment of a computer system that may be incorporated as part of the described computerized devices, in accordance with certain embodiments of the present disclosure.

A computer system as illustrated in FIG. 9 may be incorporated as part of the previously described computerized devices, such as a television receiver or television service provider system. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A method comprising:
    processing, by a system comprising one or more servers, a first set of indications of selections that are received from media devices of a first plurality of media devices that are remote from the system, and associating the selections with a first plurality of users;
    processing, by the system, a second set of indications of selections that are received from media devices of a second plurality of media devices that are remote from the system;
    based at least in part on the first set of indications of selections and the second set of indications of selections, retaining associations, in one or more repositories of the system, of each user of a first plurality of users with one or more media devices of the second plurality of media devices and/or with one or more other users of a second plurality of users;
    the processing the first set of indications comprising, for each user of the first plurality of users:
        processing indications of ratings of audio and video content that are received by the system, via a network, from the respective media device associated with the user and consequent to selections of user-selectable options to rate the audio and video content provided with the respective media device;
        retaining ratings information associated with the user in the one or more repositories, the ratings information being at least partially based on the indications;
        ranking the user based at least in part on a respective metric of the user that is determined by the system and at least one correlation to at least one category associated with audio and video content;
    based at least in part on the rankings of the first plurality of users and the retained associations:
        selecting at least one user of the first plurality of users and content corresponding to at least some of the audio and video content rated by the at least one user; and
        transmitting the content from the system to at least one media device of the second plurality of media devices or a second media device that is associated with one of the users of the second plurality of users, where the one of the users of the second plurality of users is designated as a follower of the at least one user of the first plurality of users;
        consequent to the transmitting the content, monitoring, by the system, for indications, from the at least one media device or the second media device, of end-user actions corresponding to accessing the content for at least a threshold amount of time; and
        when the content is determined to have been accessed by the one of the users of the second plurality of users for at least the threshold amount of time, adjusting a profile for the at least one user of the first plurality of users that is retained by the system, wherein the profile for the at least one user is based at least in part on a plurality of accesses of the content by at least some of the second plurality of users for at least the threshold amount of time.

2. The method as recited in claim 1, where the content comprises a recommendation corresponding to the at least some of the audio and video content rated by the at least one user.

3. The method as recited in claim 1, where the respective metric is based at least in part on a number of users from the second plurality of users that are designated as followers of the user.

4. The method as recited in claim 1, where the one of the users of the second plurality of users is designated as a follower of the at least one user of the first plurality of users.

5. The method as recited in claim 1, where the end-user actions comprise one or both of implicit indicia and explicit indicia of user preferences.

6. The method as recited in claim 5, further comprising:
using the indications of the end-user actions to adjust a profile for the at least one user of the first plurality of users that is retained by the system.

7. The method as recited in claim 5, where the indications change the respective metric, and the method further comprises:
subsequently ranking the user based at least in part on the changed respective metric of the user.

8. A system comprising:
one or more network interfaces accessible from a network and one or more servers coupled to at least one of the one or more network interfaces and to one or more repositories, the one or more servers to execute instructions to perform:
processing a first set of indications of selections that are received from media devices of a first plurality of media devices that are remote from the system, and associating the selections with a first plurality of users;
processing a second set of indications of selections that are received from media devices of a second plurality of media devices that are remote from the system;
based at least in part on the first set of indications of selections and the second set of indications of selections, retaining associations, in the one or more repositories, of each user of a first plurality of users with one or more media devices of the second plurality of media devices and/or with one or more other users of a second plurality of users;
the processing the first set of indications comprising, for each user of the first plurality of users:
processing indications of ratings of audio and video content that are received by the system, via a network, from the respective media device associated with the user and consequent to selections of user-selectable options to rate the audio and video content provided with the respective media device;
retaining ratings information associated with the user in the one or more repositories, the ratings information being at least partially based on the indications;
ranking the user based at least in part on a respective metric of the user that is determined by the system and at least one correlation to at least one category associated with audio and video content;
based at least in part on the rankings of the first plurality of users and the retained associations:

selecting at least one user of the first plurality of users and content corresponding to at least some of the audio and video content rated by the at least one user; and
transmitting the content from the system to at least one media device of the second plurality of media devices or a second media device that is associated with one of the users of the second plurality of users, where the one of the users of the second plurality of users is designated as a follower of the at least one user of the first plurality of users;
consequent to the transmitting the content, monitoring for indications, from the at least one media device or the second media device, of end-user actions corresponding to accessing the content for at least a threshold amount of time; and
when the content is determined to have been accessed by the one of the users of the second plurality of users for at least the threshold amount of time, adjusting a profile for the at least one user of the first plurality of users that is retained by the system, wherein the profile for the at least one user is based at least in part on a plurality of accesses of the content by at least some of the second plurality of users for at least the threshold amount of time.

9. The system as recited in claim 8, where the content comprises a recommendation corresponding to the at least some of the audio and video content rated by the at least one user.

10. The system as recited in claim 8, where the respective metric is based at least in part on a number of users from the second plurality of users that are designated as followers of the user.

11. The system as recited in claim 8, where the one of the users of the second plurality of users is designated as a follower of the at least one user of the first plurality of users.

12. The system as recited in claim 8, where the end-user actions comprise one or both of implicit indicia and explicit indicia of user preferences.

13. The system as recited in claim 12, the one or more servers further to perform:
using the indications of the end-user actions to adjust a profile for the at least one user of the first plurality of users that is retained by the system.

14. The system as recited in claim 12, where the indications change the respective metric, and the one or more servers further to perform:
subsequently ranking the user based at least in part on the changed respective metric of the user.

15. One or more non-transitory, machine-readable media comprising processor-readable instructions which, when executed by one or more processing devices, cause the one or more processing devices to perform:
processing a first set of indications of selections that are received from media devices of a first plurality of media devices that are remote from the one or more processing devices, and associating the selections with a first plurality of users;
processing a second set of indications of selections that are received from media devices of a second plurality of media devices that are remote from the one or more processing devices;
based at least in part on the first set of indications of selections and the second set of indications of selections, retaining associations, in one or more repositories, of each user of a first plurality of users with one or more media devices of the second plurality of media devices and/or with one or more other users of a second plurality of users;

the processing the first set of indications comprising, for each user of the first plurality of users:

processing indications of ratings of audio and video content that are received by the one or more processing devices, via a network, from the respective media device associated with the user and consequent to selections of user-selectable options to rate the audio and video content provided with the respective media device;

retaining ratings information associated with the user in the one or more repositories, the ratings information being at least partially based on the indications;

ranking the user based at least in part on a respective metric of the user that is determined by the one or more processing devices and at least one correlation to at least one category associated with audio and video content;

based at least in part on the rankings of the first plurality of users and the retained associations:

selecting at least one user of the first plurality of users and content corresponding to at least some of the audio and video content rated by the at least one user; and cause transmitting of the content to at least one media device of the second plurality of media devices or a second media device that is associated with one of the users of the second plurality of users, where the one of the users of the second plurality of users is designated as a follower of the at least one user of the first plurality of users;

consequent to the transmitting the content, monitoring for indications, from the at least one media device or the second media device, of end-user actions corresponding to accessing the content for at least a threshold amount of time; and when the content is determined to have been accessed by the one of the users of the second plurality of users for at least the threshold amount of time, adjusting a profile for the at least one user of the first plurality of users that is retained by the one or more respositories, wherein the profile for the at least one user is based at least in part on a plurality of accesses of the content by at least some of the second plurality of users for at least the threshold amount of time.

16. The one or more non-transitory, machine-readable media as recited in claim 15, where the content comprises a recommendation corresponding to the at least some of the audio and video content rated by the at least one user.

17. The one or more non-transitory, machine-readable media as recited in claim 15, where the respective metric is based at least in part on a number of users from the second plurality of users that are designated as followers of the at least one user.

18. The one or more non-transitory, machine-readable media as recited in claim 15, where the one of the users of the second plurality of users is designated as a follower of the at least one user of the first plurality of users.

19. The one or more non-transitory, machine-readable media as recited in claim 15, where the end-user actions comprise one or both of implicit indicia and explicit indicia of user preferences.

20. The one or more non-transitory, machine-readable media as recited in claim 19, the one or more processing devices further to perform:

using the indications of the end-user actions to adjust a profile for the at least one user of the first plurality of users that is retained by the one or more repositories.

\* \* \* \* \*